US011463654B1

(12) United States Patent
Beavers et al.

(10) Patent No.: US 11,463,654 B1
(45) Date of Patent: Oct. 4, 2022

(54) BILATERAL COMMUNICATION IN A LOGIN-FREE ENVIRONMENT

(71) Applicant: Allstate Insurance Company, Northbrook, IL (US)

(72) Inventors: Sean Michael Beavers, Morton Grove, IL (US); David L. Gilkison, Libertyville, IL (US); Pinal Patel, Libertyville, IL (US); Steven Genc, Hainesville, IL (US); David M. Zahn, Lake Villa, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 121 days.

(21) Appl. No.: 16/248,277

(22) Filed: Jan. 15, 2019

Related U.S. Application Data

(63) Continuation-in-part of application No. 15/874,629, filed on Jan. 18, 2018, now Pat. No. 10,742,812, which is a continuation-in-part of application No. 15/294,147, filed on Oct. 14, 2016, now Pat. No. 10,657,599.

(51) Int. Cl.
*G06Q 40/00* (2012.01)
*H04N 7/14* (2006.01)
*G06T 7/00* (2017.01)
*G06Q 40/08* (2012.01)
(Continued)

(52) U.S. Cl.
CPC .............. *H04N 7/147* (2013.01); *G06Q 40/08* (2013.01); *G06T 7/0002* (2013.01); *G06T 2207/30184* (2013.01); *H04L 65/403* (2013.01); *H04L 67/01* (2022.05)

(58) Field of Classification Search
CPC ...... H04N 7/147; G06Q 40/08; G06T 7/0002; G06T 2207/30184; H04L 65/403; H04L 67/42
See application file for complete search history.

(56) References Cited

U.S. PATENT DOCUMENTS

D297,243 S    8/1988  Wells-Papanek et al.
D298,144 S   10/1988  Wells-Papanek et al.
(Continued)

FOREIGN PATENT DOCUMENTS

EP    2 648 364 A2    10/2013
WO   2010120303 A2   10/2010
(Continued)

OTHER PUBLICATIONS

Narendra et al: "MobiCoStream: Real-time Collaborative Video Upstream for Mobile Augmented Reality Applications", 2014 IEEE International Conference on Advanced Networks and Telecommuncations Systems (ANTS), Dec. 2014. (Year: 2014).*
(Continued)

*Primary Examiner* — Edward J Baird
(74) *Attorney, Agent, or Firm* — Foley & Lardner LLP

(57) ABSTRACT

A method, medium, and apparatus for allowing evaluation of property, such as damaged property, remotely and efficiently. A mobile computing device may be used to conduct bilateral communication between a client and an agent for evaluating
(Continued)

property. Systems and methods may be used to efficiently automate intake of communications and intelligently load-balance resources for handling calls.

19 Claims, 18 Drawing Sheets

(51) Int. Cl.
*H04L 65/403* (2022.01)
*H04L 67/01* (2022.01)

(56) References Cited

U.S. PATENT DOCUMENTS

| | | |
|---|---|---|
| D299,142 S | 12/1988 | Berg |
| 5,870,711 A | 2/1999 | Huffman |
| D416,240 S | 11/1999 | Jensen et al. |
| D468,748 S | 1/2003 | Inagaki |
| 6,744,878 B1 | 6/2004 | Komissarchik et al. |
| 6,771,765 B1 | 8/2004 | Crowther et al. |
| D523,442 S | 6/2006 | Hiramatsu |
| 7,088,814 B1 * | 8/2006 | Shaffer ............... H04M 3/5233 |
| | | 379/265.01 |
| 7,103,171 B1 | 9/2006 | Annadata et al. |
| D534,539 S | 1/2007 | Frey et al. |
| D539,808 S | 4/2007 | Cummins et al. |
| D544,494 S | 6/2007 | Cummins |
| D547,365 S | 7/2007 | Reyes et al. |
| 7,289,964 B1 | 10/2007 | Bowman-Amuah |
| D562,339 S | 2/2008 | Keohane |
| D569,871 S | 5/2008 | Anastasopoulos et al. |
| D570,864 S | 6/2008 | Sadler et al. |
| D574,008 S | 7/2008 | Armendariz et al. |
| D576,634 S | 9/2008 | Clark et al. |
| D579,943 S | 11/2008 | Clark et al. |
| D580,941 S | 11/2008 | Scott et al. |
| D580,942 S | 11/2008 | Oshiro et al. |
| D582,936 S | 12/2008 | Scalisi et al. |
| D583,386 S | 12/2008 | Tomizawa et al. |
| D583,823 S | 12/2008 | Chen et al. |
| D587,276 S | 2/2009 | Noviello et al. |
| D590,407 S | 4/2009 | Watanabe et al. |
| D592,219 S | 5/2009 | Agarwal et al. |
| D594,026 S | 6/2009 | Ball et al. |
| D594,872 S | 6/2009 | Akimoto |
| D596,192 S | 7/2009 | Shotel |
| D608,366 S | 1/2010 | Matas |
| D614,194 S | 4/2010 | Guntaur et al. |
| D616,450 S | 5/2010 | Simons et al. |
| D617,804 S | 6/2010 | Hirsch |
| 7,936,867 B1 | 5/2011 | Hill et al. |
| 8,046,281 B1 | 10/2011 | Urrutia |
| D648,735 S | 11/2011 | Arnold et al. |
| 8,347,295 B1 | 1/2013 | Robertson et al. |
| D676,456 S | 2/2013 | Walsh et al. |
| D677,275 S | 3/2013 | Wujcik et al. |
| D677,326 S | 3/2013 | Gleasman et al. |
| D677,686 S | 3/2013 | Reyna et al. |
| D678,904 S | 3/2013 | Phelan |
| D681,654 S | 5/2013 | Hirsch et al. |
| D682,849 S | 5/2013 | Aoshima |
| D682,873 S | 5/2013 | Frijlink et al. |
| D683,751 S | 6/2013 | Carpenter et al. |
| D684,587 S | 6/2013 | Plesnicher et al. |
| D685,386 S | 7/2013 | Makhlouf |
| D687,061 S | 7/2013 | Cueto et al. |
| D687,454 S | 8/2013 | Edwards et al. |
| D687,455 S | 8/2013 | Edwards et al. |
| 8,510,196 B1 | 8/2013 | Brandmaier et al. |
| D689,068 S | 9/2013 | Edwards et al. |
| D691,157 S | 10/2013 | Ramesh et al. |
| D691,618 S | 10/2013 | Chen et al. |
| D693,835 S | 11/2013 | Daniel |
| 8,712,893 B1 * | 4/2014 | Brandmaier ........... G06Q 40/08 |
| | | 705/35 |
| D704,205 S | 5/2014 | Greisson et al. |
| D706,796 S | 6/2014 | Talbot |
| D708,210 S | 7/2014 | Capua et al. |
| D709,517 S | 7/2014 | Meegan et al. |
| D711,411 S | 8/2014 | Yu et al. |
| D715,814 S | 10/2014 | Brinda et al. |
| D716,329 S | 10/2014 | Wen et al. |
| D719,583 S | 12/2014 | Edwards et al. |
| D719,968 S | 12/2014 | Ebtekar et al. |
| D720,363 S | 12/2014 | Ranz et al. |
| D725,139 S | 3/2015 | Izotov et al. |
| 8,977,237 B1 | 3/2015 | Sander et al. |
| D727,931 S | 4/2015 | Kim et al. |
| D729,264 S | 5/2015 | Satalkar et al. |
| D730,371 S | 5/2015 | Lee |
| D730,388 S | 5/2015 | Rehberg et al. |
| D731,510 S | 6/2015 | Kiruluta et al. |
| D731,512 S | 6/2015 | Xu et al. |
| D733,185 S | 6/2015 | Smith et al. |
| D734,358 S | 7/2015 | Rehberg et al. |
| D735,221 S | 7/2015 | Mishra et al. |
| D735,223 S | 7/2015 | Prajapati et al. |
| D735,745 S | 8/2015 | Zuckerberg et al. |
| D738,894 S | 9/2015 | Kim et al. |
| D738,906 S | 9/2015 | Frijlink et al. |
| D746,862 S | 1/2016 | Lee et al. |
| D748,112 S | 1/2016 | Vonshak et al. |
| D751,086 S | 3/2016 | Winther et al. |
| D752,059 S | 3/2016 | Yoo |
| D755,830 S | 5/2016 | Chaudhri et al. |
| D759,080 S | 6/2016 | Luo et al. |
| D759,663 S | 6/2016 | Kim et al. |
| D759,687 S | 6/2016 | Chang et al. |
| 9,367,535 B2 | 6/2016 | Bedard et al. |
| D760,772 S | 7/2016 | Winther et al. |
| D761,303 S | 7/2016 | Nelson et al. |
| D761,841 S | 7/2016 | Jong et al. |
| D763,282 S | 8/2016 | Lee |
| D764,483 S | 8/2016 | Heinrich et al. |
| 9,407,874 B2 | 8/2016 | Laurentino et al. |
| D766,286 S | 9/2016 | Lee et al. |
| D766,289 S | 9/2016 | Bauer et al. |
| D767,598 S | 9/2016 | Choi |
| 9,443,270 B1 | 9/2016 | Friedman et al. |
| D768,162 S | 10/2016 | Chan et al. |
| D768,202 S | 10/2016 | Malkiewicz |
| D769,253 S | 10/2016 | Kim et al. |
| D770,513 S | 11/2016 | Choi et al. |
| 9,501,798 B1 | 11/2016 | Urrutia et al. |
| D773,481 S | 12/2016 | Everette et al. |
| D773,523 S | 12/2016 | Kisselev et al. |
| D774,078 S | 12/2016 | Kisselev et al. |
| D775,144 S | 12/2016 | Vazquez |
| D780,202 S | 2/2017 | Bradbury et al. |
| D785,009 S | 4/2017 | Lim et al. |
| D789,956 S | 6/2017 | Ortega et al. |
| D792,424 S | 7/2017 | Meegan et al. |
| D792,441 S | 7/2017 | Gedrich et al. |
| D795,287 S | 8/2017 | Sun |
| D797,117 S | 9/2017 | Sun |
| D797,769 S | 9/2017 | Li |
| D800,748 S | 10/2017 | Jungmann et al. |
| 9,824,453 B1 | 11/2017 | Collins et al. |
| D806,101 S | 12/2017 | Frick et al. |
| D809,542 S | 2/2018 | Lu |
| D809,561 S | 2/2018 | Forsblom |
| D814,518 S | 4/2018 | Martin et al. |
| D814,520 S | 4/2018 | Martin et al. |
| D815,667 S | 4/2018 | Yeung |
| 9,947,050 B1 | 4/2018 | Pietrus et al. |
| D819,647 S | 6/2018 | Chen et al. |
| D820,296 S | 6/2018 | Aufmann et al. |
| D822,688 S | 7/2018 | Lee et al. |
| D822,711 S | 7/2018 | Bachman et al. |
| D826,984 S | 8/2018 | Gatts et al. |
| D830,408 S | 10/2018 | Clediere |
| D832,875 S | 11/2018 | Yeung et al. |
| D834,613 S | 11/2018 | Lee et al. |
| D837,814 S | 1/2019 | Lamperti et al. |

(56) References Cited

U.S. PATENT DOCUMENTS

| | | |
|---|---|---|
| D841,669 S | 2/2019 | Hansen et al. |
| D844,020 S | 3/2019 | Spector |
| D845,332 S | 4/2019 | Shriram et al. |
| D847,161 S | 4/2019 | Chaudhri et al. |
| D851,112 S | 6/2019 | Papolu et al. |
| D851,126 S | 6/2019 | Tauban |
| D851,127 S | 6/2019 | Tauban |
| D851,663 S | 6/2019 | Guesnon, Jr. |
| D851,668 S | 6/2019 | Jiang et al. |
| D852,217 S | 6/2019 | Li |
| D853,407 S | 7/2019 | Park |
| D858,571 S | 9/2019 | Jang |
| D859,445 S | 9/2019 | Clediere |
| D863,340 S | 10/2019 | Kana |
| D865,795 S | 11/2019 | Koo |
| D866,582 S | 11/2019 | Koo |
| 2002/0029285 A1* | 3/2002 | Collins ............... H04L 67/1002 709/232 |
| 2003/0187672 A1 | 10/2003 | Gibson et al. |
| 2004/0224772 A1 | 11/2004 | Canessa et al. |
| 2004/0249650 A1* | 12/2004 | Freedman ............... G06Q 30/02 705/7.29 |
| 2005/0038682 A1 | 2/2005 | Gandee et al. |
| 2005/0204148 A1* | 9/2005 | Mayo ................. H04L 63/0815 713/185 |
| 2006/0009213 A1* | 1/2006 | Sturniolo ................ H04W 8/02 455/432.1 |
| 2007/0130197 A1 | 6/2007 | Richardson et al. |
| 2007/0219816 A1 | 9/2007 | Van Luchene et al. |
| 2007/0265949 A1 | 11/2007 | Elder |
| 2007/0282639 A1 | 12/2007 | Leszuk et al. |
| 2008/0015887 A1 | 1/2008 | Drabek et al. |
| 2008/0147448 A1* | 6/2008 | McLaughlin ........... G06Q 40/08 705/4 |
| 2008/0255917 A1 | 10/2008 | Mayfield et al. |
| 2008/0300924 A1 | 12/2008 | Savage et al. |
| 2009/0183114 A1 | 7/2009 | Matulic |
| 2010/0125464 A1 | 5/2010 | Gross et al. |
| 2010/0130176 A1* | 5/2010 | Wan ....................... G06Q 30/02 455/414.1 |
| 2010/0205567 A1 | 8/2010 | Haire et al. |
| 2010/0223172 A1 | 9/2010 | Donnelly et al. |
| 2011/0015947 A1 | 1/2011 | Erry et al. |
| 2013/0204645 A1 | 8/2013 | Lehman et al. |
| 2013/0226624 A1 | 8/2013 | Blessman et al. |
| 2013/0317864 A1 | 11/2013 | Tofte et al. |
| 2014/0104372 A1 | 4/2014 | Calman et al. |
| 2014/0240445 A1 | 8/2014 | Jaynes |
| 2014/0288976 A1 | 9/2014 | Thomas et al. |
| 2014/0320590 A1 | 10/2014 | Laurentino et al. |
| 2014/0369668 A1 | 12/2014 | Onoda |
| 2015/0025915 A1 | 1/2015 | Lekas |
| 2015/0187017 A1 | 7/2015 | Weiss |
| 2015/0189362 A1 | 7/2015 | Lee et al. |
| 2015/0244751 A1 | 8/2015 | Lee et al. |
| 2015/0248730 A1* | 9/2015 | Pilot ....................... G06Q 40/08 705/4 |
| 2015/0278728 A1 | 10/2015 | Dinamani et al. |
| 2015/0365342 A1* | 12/2015 | McCormack ....... H04L 43/0817 709/224 |
| 2016/0080570 A1 | 3/2016 | O'Connor et al. |
| 2016/0171486 A1* | 6/2016 | Wagner ................. G06Q 20/38 705/39 |
| 2016/0171622 A1 | 6/2016 | Perkins et al. |
| 2016/0203443 A1 | 7/2016 | Wheeling |
| 2016/0217433 A1 | 7/2016 | Walton et al. |
| 2017/0068526 A1* | 3/2017 | Seigel ................. G06F 11/3409 |
| 2017/0126812 A1 | 5/2017 | Singhal |
| 2017/0154383 A1 | 6/2017 | Wood |
| 2017/0352103 A1 | 12/2017 | Choi et al. |
| 2018/0007059 A1 | 1/2018 | Innes et al. |
| 2018/0108091 A1 | 4/2018 | Beavers et al. |
| 2019/0149772 A1 | 5/2019 | Fernandes et al. |

FOREIGN PATENT DOCUMENTS

| | | | | |
|---|---|---|---|---|
| WO | WO-2013033259 A2 * | 3/2013 | ......... | H04N 21/2343 |
| WO | WO-2015/131121 A1 | 9/2015 | | |

OTHER PUBLICATIONS

Osório et al: "A Service Integration Platform for Collaborative Networks" Studies in Informatics and Control, vol. 20, No. 1, Mar. 2011 (Year: 2011).*

Aug. 23, 2019—U.S. Final Office Action—U.S. Appl. No. 15/294,147.

Mar. 12, 2019—U.S. Non-Final Office Action—U.S. Appl. No. 15/294,147.

"TIA launches mobile app for insured object inspection in the field" http://www.tiatechnology.com/en/whats-new/tia-technology-launches-mobile-app-for-insured-object-inspection-in-the-field/ site visited Sep. 19, 2016, pp. 1-4.

"New Inspection Mobile App Enables Real-Time Inspection of Insurance Claims" http://www.prnewswire.com/news-releases/new-inspection-mobile-app-enables-real-time-inspection-of-insurance-claims-300114092.html Jul. 16, 2015, pp. 1-3.

"Residential/Commercial Storm Damage Report Mobile App" http://www.gocanvas.com/mobile-forms-apps/22692-Residential-Commercial-Storm-Damage-Report site visited Sep. 19, 2016, pp. 1-6.

Oct. 17, 2017—U.S. Non-Final Office Action—U.S. Appl. No. 15/679,946.

Royalwise; "iMessages and FaceTime Sharing Issues"; Publication date: Dec. 10, 2014; Date Accessed: Nov. 8, 2017; URL: <http://royalwise.com/imessages-facetime-sharing-issues/>.

Drippler; "15 Best Camera Apps for Android"; Publication date: Jun. 8, 2016; Date Accessed: Nov. 8, 2017; URL: <http://drippler.com/drip/15-best-camera-apps-android>.

IPhone Life; "Tip of the Day: How to Move your Image in FaceTime"; Publication date: Feb. 16, 2015; Date Accessed: Nov. 8, 2017; URL: <https://www.iphonelife.com/blog/32671/how-move-your-image-facetime>.

CNET; "OoVoo Mobile takes on Qik Fring for Android video chat"; Publication date: Dec. 15, 2010; Date Accessed: Nov. 8, 2017; URL: <https://www.cnet.com/news/oovoo-mobile-takes-on-qik-fring-for-android-video-chat/>.

Microsoft; "OoVoo—Video Calls and Messaging"; Publication date unknown but prior to filing date; Date Accessed: Nov. 8, 2017; URL: <https://www.microsoft.com/en-us/store/p/oovoo-video-calls-and-messaging/9wzdncrfj478>.

Softonic; "How to make video calls with Viber on Android and iOS"; Publication date: Sep. 12, 2014; Date Accessed: Nov. 8, 2017; URL: <https://en.softonic.com/articles/how-to-make-video-calls-with-viber-on-android-and-ios>.

CNET; "Who needs FaceTime? 4 video-calling apps for Android"; Publication date: Mar. 20, 2015; Date Accessed: Nov. 8, 2017; URL: <https://www.cnet.com/news/android-video-calling-apps/>.

Jan. 5, 2018—(WO) International Search Report—PCT/US17/56490.

Apr. 27, 2018—U.S. Final Office Action—U.S. Appl. No. 15/679,946.

Sep. 6, 2018—U.S. Notice of Allowance—U.S. Appl. No. 15/679,946.

"Leader Delegation and Trust in Global Software Teams", Zhang, New Jersey Institute of Technology, ProQuest Dissertations Publishing, Year 2008.

Jan. 9, 2019—U.S. Non-Final Office Action—U.S. Appl. No. 29/627,412.

Mar. 4, 2019—(CA) Office Action—Application 181524.

Jun. 25, 2019—U.S. Final Office Action—U.S. Appl. No. 29/627,412.

Screens Icons, Andrejs Kirma, Dec. 28, 2016, iconfinder.com [online], [site visited Jun. 19, 2019], https://www.iconfinder.com/iconsets/screens-2, Year 2016.

Baraghimian & Young, "GeoSpaces/sup TM/-A virtual collaborative software environment for interactive analysis and visualization of geospatial information," IGARSS 2001. Scanning the Present and Resolving the Future. Proceedings. IEEE 2001 International Geoscience and Remote Sensing Symposium (Cat. No. 01CH37217), pp. 1678-1680 (2001).

(56) References Cited

OTHER PUBLICATIONS

Non-Final Office Action for U.S. Appl. No. 16/848,275 dated Oct. 1, 2021, 9 pages.
Non-Final Office Action for U.S. Appl. No. 16/919,899 dated Nov. 2, 2021, 13 pages.
Final Office Action on U.S. Appl. No. 16/919,899 dated May 2, 2022, 11 pages.
Final Office Action for U.S. Appl. No. 16/848,275 dated Feb. 18, 2022, 9 pages.
Office Action on U.S. Appl. No. 16/848,275 dated Jun. 9, 2022, 13 pages.

* cited by examiner

Live Status

Total of 10 Users

| Name | Skill | Status | Duration |
|---|---|---|---|
| John Doe | Property | Available | |
| Jane Doe | Property | Available | |
| John Doe | Auto | In Video Call | |
| John Doe | Property | In Video Call | |
| Jane Doe | Auto | Wrap Up | |
| John Doe | Auto | In Video Call | |
| Jane Doe | Auto | Unavailable | |
| John Doe | Auto | In Video Call | |
| Jane Doe | Auto | Logged Out | |
| Jane Doe | Auto | Wrap Up | |

Fig. 6A

BILATERAL COMMUNICATION IN A LOGIN-FREE ENVIRONMENT

CROSS REFERENCE TO RELATED APPLICATIONS

This application is a continuation-in-part of U.S. patent application Ser. No. 15/874,629, filed Jan. 18, 2018, entitled "BILATERAL COMMUNICATION IN A LOGIN-FREE ENVIRONMENT", which is a continuation-in-part of U.S. patent application Ser. No. 15/294,147, filed Oct. 14, 2016, entitled "VIRTUAL COLLABORATION", all of which are incorporated herein by reference in their entirety.

FIELD OF ART

The present disclosure relates to communications systems for evaluation of property by a remote viewing device. More specifically, it relates to methods, software, and apparatuses for a login-free audiovisual teleconference between two users for property evaluation.

BACKGROUND

Traditional customer service systems may allow contact between users without travel or making appointments, but telephonic communication is virtually useless for allowing accurate property evaluation by remote means. Sending pictures is similarly deficient, especially if an owner does not understand how best to portray the property.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for providing two-way audiovisual communication between a client, who may be an owner of the property being evaluated and an agent, who may be a user of a plurality of users associated with one or more systems or devices evaluating the property. The two-way audiovisual communication may be performed using a camera and microphone of a mobile computing device of the client and a camera and microphone of a computer of the agent remote from the client.

The plurality of users may be organized in a queue ranked by amount of time spent waiting to answer an owner's call. When the system receives a client call, the system may automatically route the call to an appropriate queue based on the prioritized ranking. The system may then utilize a camera on the client device to capture images and/or video of property according to the systems and methods described herein. Information gathered from the call may be used in evaluating the property.

An administrative system may monitor the queue and to manage individual agents by modifying their attributes in order to keep the queue balanced with demand for agents appropriate to the distribution of clients currently calling.

Calls may be dynamically connected in a login-free environment in order to facilitate data collection for one or more organizations. Methods and systems may facilitate data collection, reconnection in the event of disconnections, and/or call degradation handling in the event of weak or unstable connections.

Agents may be reassigned using a skill-based approach wherein agents are assigned based on a primary skill, but may be reassigned based on one or more secondary skills if the need arises.

Photos taken throughout the call process may be analyzed to determine if there are any inconsistencies indicative of fraud.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 6A depicts an example user interface used for a queue manager to obtain information on the status of the queue according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
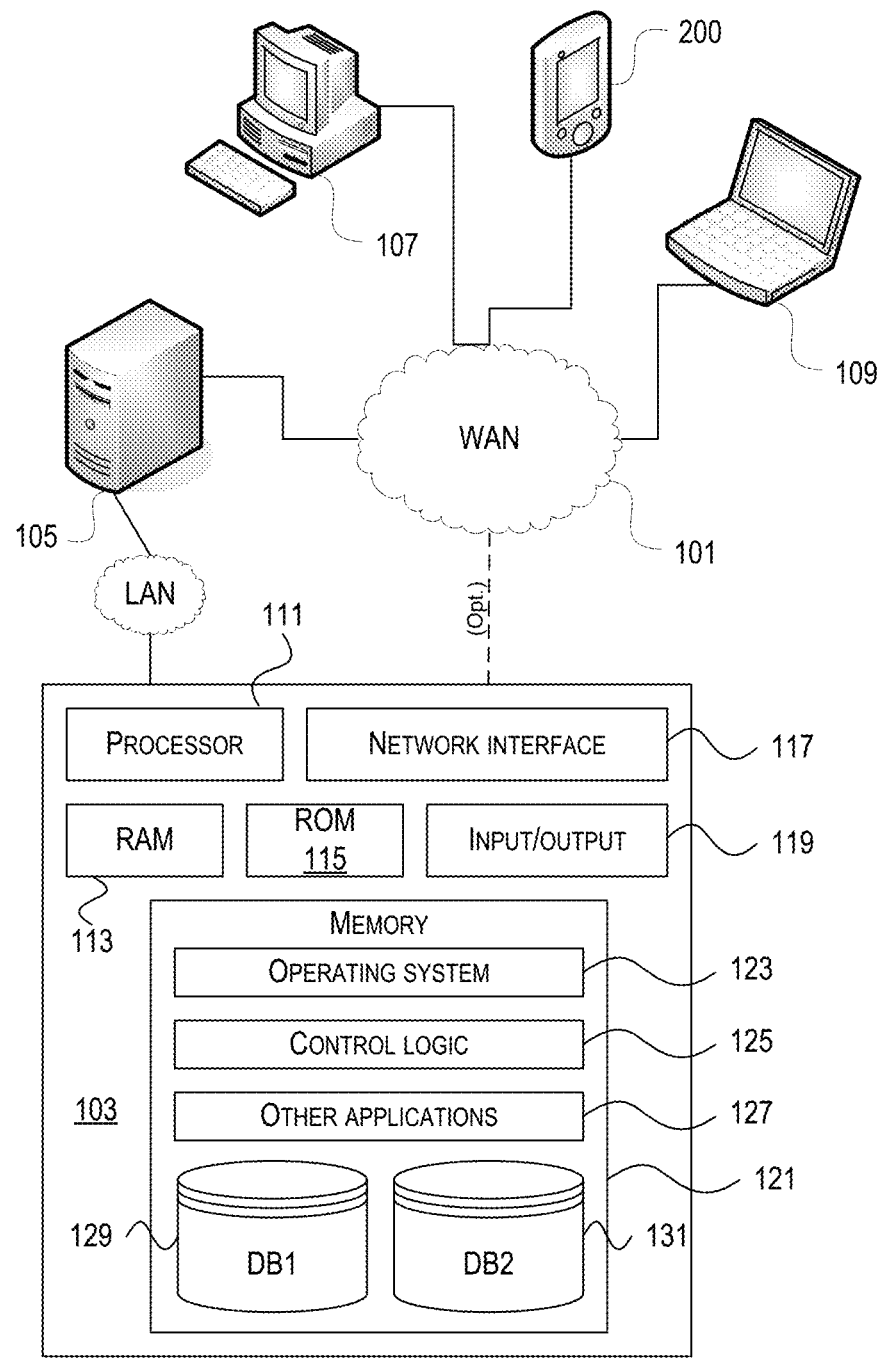
FIG. 1 illustrates a network environment and computing system that may be used to implement aspects of the disclosure.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include virtual collaboration server 103, web server 105, and client computers 107, 109. Virtual collaboration server 103 provides overall access, control and administration of databases and control software for performing one or more illustrative aspects described herein. Virtual collaboration server 103 may be connected to web server 105 through which users interact with and obtain data as requested. Alternatively, virtual collaboration server 103 may act as a web server itself and be directly connected to the Internet. Virtual collaboration server 103 may be connected to web server 105 through the network 101 (e.g., the Internet), via direct or indirect connection, or via some other network. Users may interact with the virtual collaboration server 103 using remote computers 107, 109, e.g., using a web browser to connect to the virtual collaboration server 103 via one or more externally exposed web sites hosted by web server 105. Client computers 107, 109 may be used in concert with virtual collaboration server 103 to access data stored therein, or may be used for other purposes. For example, from client device 107 a user may access web server 105 using an Internet browser, or by executing a software application that communicates with web server 105 and/or virtual collaboration server 103 over a computer network (such as the Internet).

Client computers 107 and 109 may also comprise a number of input and output devices, including a video camera (or "webcam"), microphone, speakers, and monitor, enabling two-way audiovisual communication to and from the client computers.

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and virtual collaboration server 103 may be combined on a single server.

Each component 103, 105, 107, 109 may be any type of computer, server, or data processing device configured to perform the functions described herein (e.g., a desktop computer, infotainment system, commercial server, mobile phone, laptop, tablet, etc.). Virtual collaboration server 103, e.g., may include a processor 111 controlling overall operation of the virtual collaboration server 103. Virtual collaboration server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the virtual collaboration server 103, control logic 125 for instructing virtual collaboration server 103 to perform aspects described herein, and other application software 127 providing secondary, support, and/or other functionality which may or may not be used in conjunction with other aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of virtual collaboration server 103 (or device 105, 107, 109) as described herein may be spread across multiple data processing devices, for example, to distribute processing load across multiple computers, and/or to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
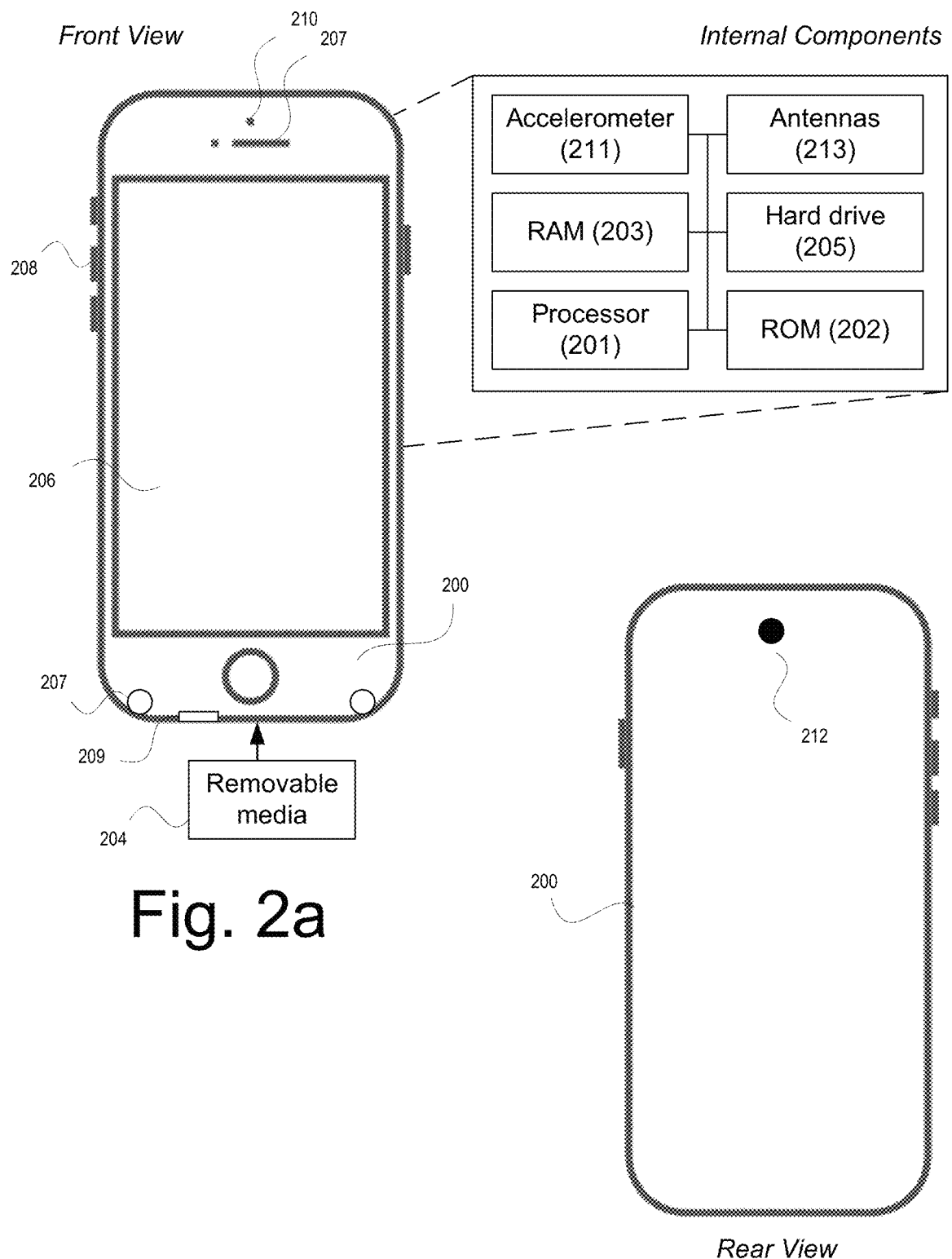
FIG. 2A illustrates a front view and internal components of an example mobile computing device that may be used to implement aspects of the disclosure.
FIG. 2B illustrates a rear view of an example mobile computing device that may be used to implement aspects of the disclosure.

FIGS. 2A and 2B illustrate a front view and rear view, respectively, of general hardware elements that can be used to implement any of the various systems or computing devices discussed herein. A mobile computing device 200, which may be a client computer 107 or 109 and may be implemented using a smartphone, personal data assistant, portable computer, laptop computer, etc., may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a secure digital (SD) card, or any other desired storage medium. Instructions may also be stored in an internal hard drive 205.

The mobile computing device 200 may include one or more output devices, such as a display 206 or one or more audio speakers 207. There may also be one or more user input devices, such as a number of buttons 208, as well as a microphone 209, a touchscreen built into display 206, and/or a forward-facing camera 210 (which may include multiple cameras for three-dimensional operation) for user gestures. The mobile computing device 200 may comprise additional sensors, including but not limited to a multiple-axis accelerometer 211 or rear-facing camera 212. Rear-facing camera 212 may further be an array of multiple cameras to allow the device to shoot three-dimensional video or determine depth. The mobile computing device may further comprise one or more antennas 213 for communicating via a cellular network, Wi-Fi or other wireless networking system, Bluetooth, near field communication (NFC), or other wireless communications protocols and methods.

The mobile device 200 is one example hardware configuration, and modifications may be made to add, remove, combine, divide, etc. components of mobile computing device 200 as desired. Multiple devices in communication with each other may be used, such as a mobile device in communication with a server or desktop computer over the Internet or another network, or a mobile device communicating with multiple sensors in other physical devices via Bluetooth, NFC, or other wireless communications protocols. Mobile computing device 200 may be a custom-built device comprising one or more of the features described above, or may be a wearable device, such as a smart watch or fitness tracking bracelet, with custom software installed, or may be a smartphone or other commercially available mobile device with a custom "app" or other software installed.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer-executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Mobile device 200 may be used to run a mobile application into which the user, in some examples, inputs information, such as a username and/or password for login, or an actual name, claim number, property type, contact information, and/or any other information relevant to an insurance claim (such as information identifying an insurance claim or an insurance policy holder). The application may then use an internet connection and/or other network connection to contact the virtual collaboration server and initiate communications with the server and/or one or more client computers. The application may also access one or more cameras and/or a microphone of the mobile device and transmit video and/or audio to a remote computer, and play video and audio received in return, to allow communications between the mobile device's operator and a remote agent.

Figure 3:
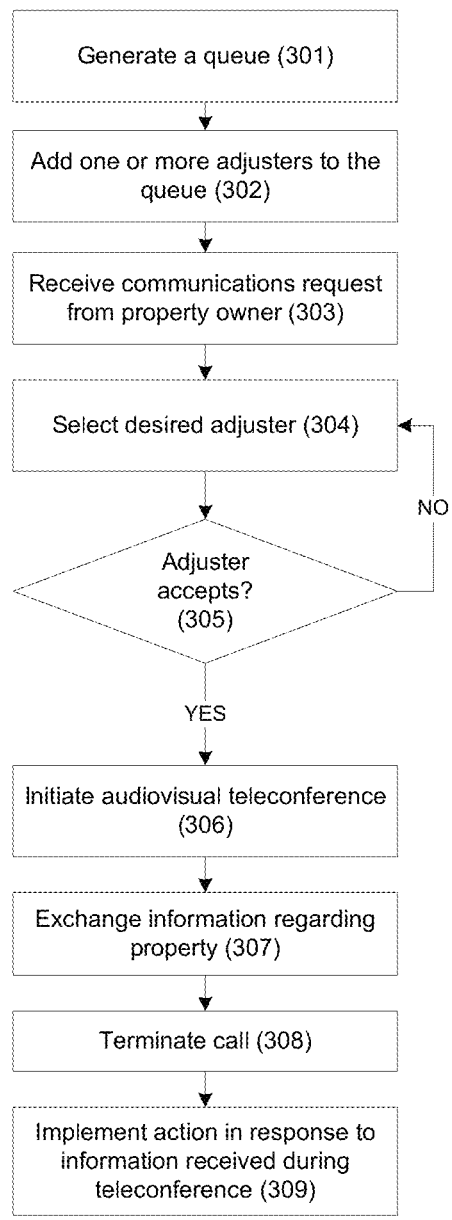
FIG. 3 is a flow diagram illustrating an example method of assigning agents in a queue to incoming calls from property owners according to one or more aspects described herein.

FIG. 3 illustrates an example programmatic flow of an embodiment according to aspects described herein. Some or all of the illustrated steps may be performed by a computing device, such as virtual collaboration server 103 illustrated in FIG. 1, executing instructions stored on a computer-readable medium.

In step 301, the system may generate a queue data structure for tracking a number of logged-in agents (e.g., claims adjusters) and one or more attributes for each agent. Attributes may include, for example, amount of time spent in the queue, amount of time spent in the queue since a last event (such as completing a call with a property owner or going idle), a classification or skill of the adjuster (such as specialization in auto claims or claims related to other property, a licensing status of an adjuster, and/or locations where the adjuster is authorized and/or licensed to practice), or a manager assigned to the given adjuster. Each claims adjuster may be associated with a computing device configured to communicate with the system and/or with one or more mobile devices of one or more users.

In step 302, the system may add one or more claims adjusters to the queue. Each claims adjuster may begin by logging in with a unique user identification such as a number or string entered into a user interface on a computing device such as device 107 or device 109 that is networked to or in communication with server 103.

When logging into the system, a claims adjuster may be prompted to select one of a number of video capture devices of the adjuster's computer to capture images and/or video during any two-way video transmissions with a user. The claims adjuster may similarly be prompted to select one of a number of audio capture devices of the adjuster's computer to capture audio during any two-way audio transmissions with a user. The adjuster may further be prompted to select one or more speakers to emit audio received from a user if more than one speaker is connected to the adjuster's computer.

Figure 4A:
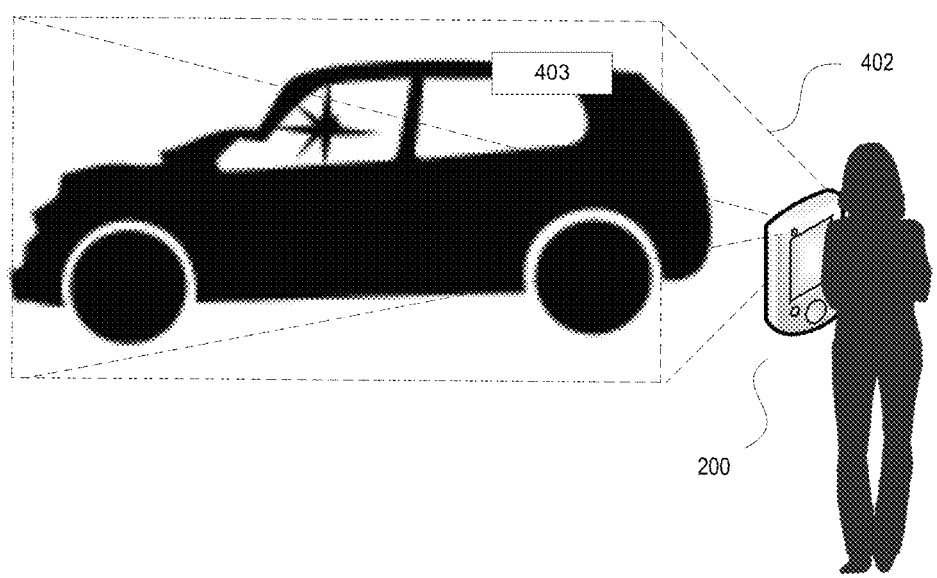
FIG. 4A depicts a property owner initiating a video transmission of his or her damaged property according to one or more aspects described herein.

In step 303, the system may receive a two-way communications request from a property owner (e.g., a client). Preferably, before initiating the communications, the property owner will move to the location of damaged property subject to an insurance claim, as depicted in FIG. 4A and described in further detail below. Further, FIG. 5 and its description below further describe the process of initiating the communications request from the property owner's viewpoint.

The request may include one or more attributes, including, for example, a property type that the property owner wishes the claims adjuster to see. The request may be received by a webserver as an HTTP (Hypertext Transfer Protocol) request, or may use another server-client style protocol or messaging architecture. The request may also comprise the property owner's name or a previously assigned username, contact information for the property owner, and/or a claim number already assigned.

An HTTP request may comprise a communicated link associated with information for a connection. The link may conform to HTTP or any other suitable standard. The link may be sent using any suitable electronic delivery method, such as e-mail, text message, etc. The link may be associated with a user so that certain identifying and/or useful information may be pre-filled automatically (e.g., the client's name, property type, damage type, location, etc.). For example, the client may be involved in a collision, and may contact his or her local agent at the site of the collision. The agent may enter in information associated with the client into the system, which may generate the personalized link which is sent to the client. If the client uses the link, the link may initiate a connection using one or more methods described herein. The link may automatically pre-fill known information for the client. For example, the link may open a webpage to initiate communications pre-filled with the client's name, automobile, and reason for initiating communication (e.g., a collision, or hail damage). In another example, the link may launch a local application with the pre-filled information.

In some instances, the request may comprise a login-free connection. In a login-free connection, the client may not present a username or other typical user identifier. Rather, the client may give information necessary for routing the call (e.g., property type, vehicle type, location, etc.) and provide identifying information on the call itself. This may serve to connect clients to an adjuster faster and with less friction (e.g., a user may not have to create a username or remember a password to initiate a call).

Property that may be damaged may include automobiles, other vehicles (such as boats, motorcycles, bicycles, mopeds, or airplanes), houses, other structures, or personal property (such as artwork, electronics, clothing, furniture, or anything else of value).

In step 304, the system may select a claims adjuster to whom the incoming call should be assigned. The system may select an adjuster on a basis of longest time waiting in queue (i.e. first in, first out), or may select based on one or more factors. For example, the system may select an adjuster who has been waiting the longest out of all adjusters with a particular attribute, such as experience with a property type identified in the request. The system may select an adjuster who has been waiting the longest out of all adjusters who are currently available and/or who has not marked himself or herself unavailable. The system may select an adjuster who has been waiting the longest out of all adjusters without being idle at his or her computer. The system may select an adjuster who has been waiting the longest out of all adjusters having a certain experience level. The experience level may be based on the adjuster's experience with handling vehicle claims and/or property claims with respect to vehicle claims. The Experience level may be based on the adjuster's experience handling cars that exceed a pre-set threshold amount (e.g., $100 k). The experience level may also be based on experience with particular property types (e.g., single family homes, townhomes, condominiums, etc.). The system may select an adjuster who has been flagged to receive the next incoming call regardless of place in the queue or time waited. The system may select an adjuster who has handled the fewest calls during a given period of time such as the last month, last week, last 24 hours, or last 8 hours. The system may select an adjuster who has declined the most or the fewest calls during a given period of time. The system may select an adjuster who has historically handled calls with a shortest call length. The system may use a number of the factors above, or other factors, to combine and score all adjusters with a numerical score on each of a plurality of criteria, selecting an adjuster with a highest overall score or an adjuster who has waited the longest in queue of all adjusters with a given score range.

Figure 4B:
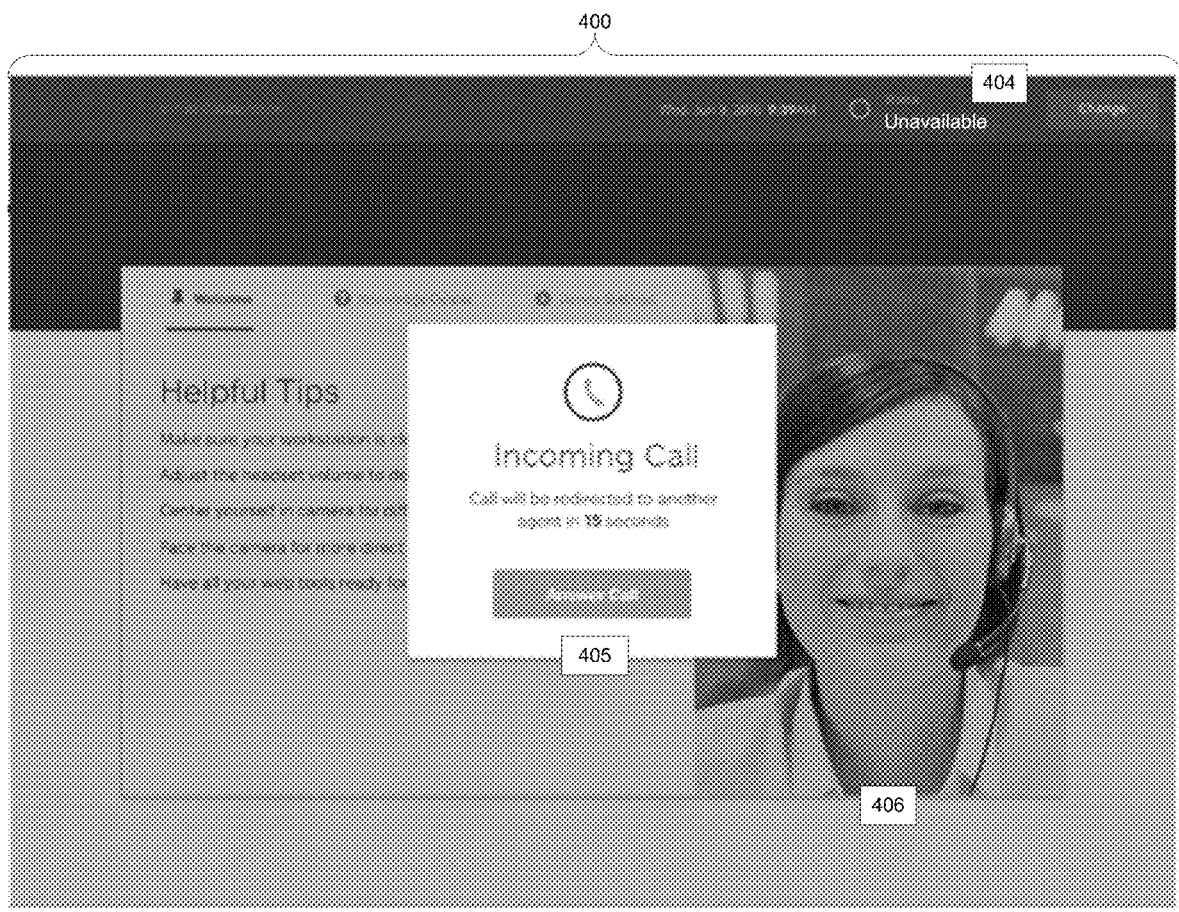
FIG. 4B depicts an example user interface used by an agent when receiving a request from a property owner for two-way audiovisual communication according to one or more aspects described herein.

Once an adjuster has been selected, in step 305, the adjuster selected by the system may be notified of the selection and prompted to accept or decline an incoming communication. FIG. 4B, described in further detail below, depicts a possible user interface for making and entering this decision. If the adjuster accepts at step 305, the process proceeds to step 306, and if the adjuster declines at step 305, the process may instead return to step 304 to select a different adjuster. If step 304 is repeated, the system may select a different adjuster by using the same criteria used for selecting the previous adjuster and selecting a second-best adjuster according to those criteria, or may select a different adjuster by using new criteria.

In step 306, a two-way audiovisual communication may be established between the property owner and the selected adjuster. A web-based protocol may be used for cross-platform communication between the system on server 103, the computing device 107 being operated by the claims adjuster, and the mobile computing device 200 being operated by the property owner. Any one of a number of existing open-source, commercial, or custom video transmission protocols and platforms may be used.

In an alternative embodiment, the system may direct that communications be established directly between adjuster's computing device 107 and property owner's mobile computing device 200, without passing through server 103.

Figure 4C:
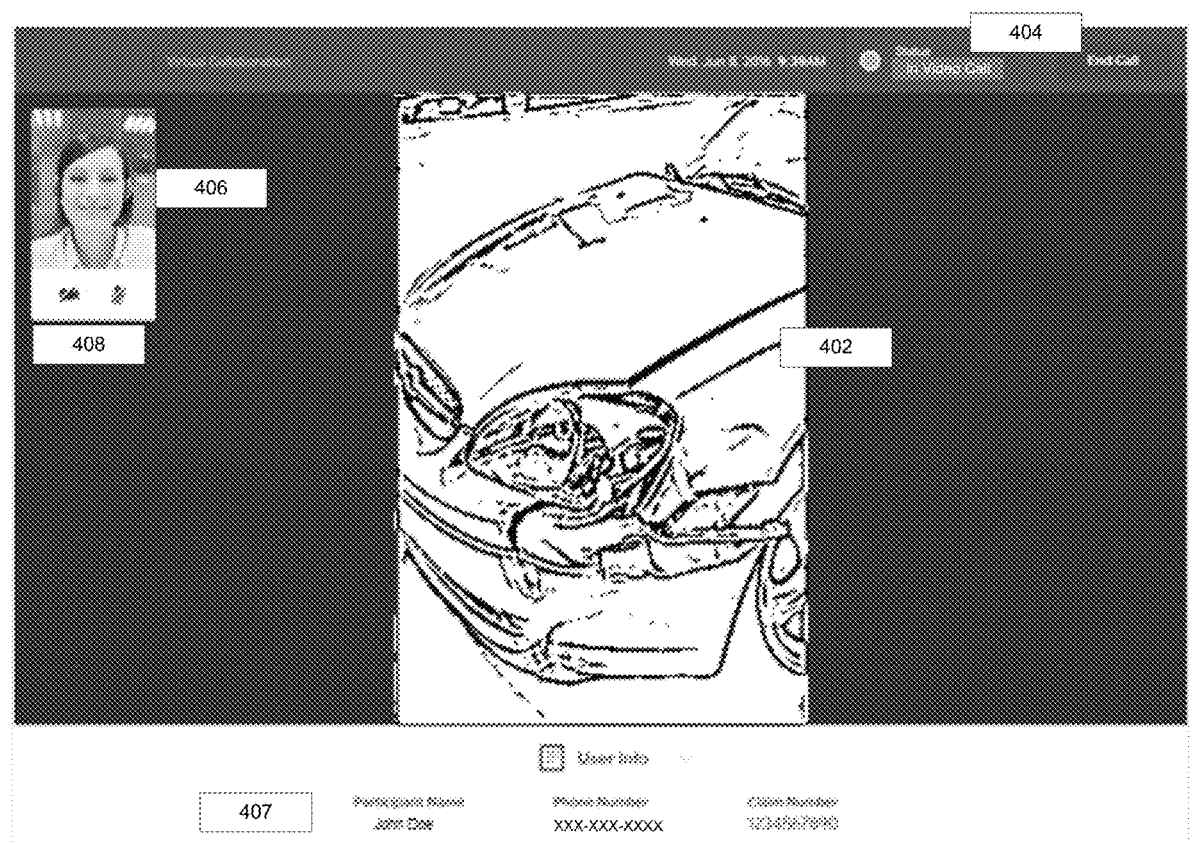
FIG. 4C depicts an example user interface used by an agent to display the two-way audiovisual communication and to converse with the property owner according to one or more aspects described herein.

In step 307, the adjuster may use the audiovisual communication to gather information regarding property that is damaged. The adjuster may view the property through a camera of mobile computing device 200, may hear the property (if, for example, it is a damaged television or musical instrument) through a microphone of the mobile computing device, may ask questions of the property owner and receive answers, or may direct the property owner to move the camera to allow the adjuster a better vantage point/different angles of viewing, or to move an obstruction out of the way for a better view. FIG. 4C, discussed further below, depicts a possible user interface used by the adjuster during the call.

If the adjuster determines that he or she is not suited to appraise the property—for example, because of user error in identifying a property type—the adjuster may input a command to terminate the call and re-generate the call request to repeat steps 303 and following, and to allow the owner to be connected to a different adjuster by the system.

The adjuster may be able to record the video from the call, record the audio from the call, or capture still images from the video. The data may be saved either locally on the adjuster's computing device or to a remote server for later retrieval. The adjuster may also be able to enter notes into a text field, annotate the video or still images, or via other user input field while viewing the property.

In step 308, the adjuster may conclude that there is sufficient data from the call to act, and may terminate the communications with the property owner.

In step 309, the adjuster may determine a next course of action and implement it. The adjuster may conclude based on the gathered information that a clear estimate of the property damage is possible, for example if there is no damage, if the property is a total loss, or if the damage is of a commonly encountered type. In this circumstance, the adjuster may be able to input an amount of money to be given to the property owner, and to automatically have a check created and mailed to the property owner, or automatically credited to a known account of the property owner. The adjuster may alternatively conclude that the damage will be difficult to estimate based on a remote viewing alone, and may be able to dispatch an adjuster to the property to view in person, or to make an appointment for the property owner to bring the property to an adjuster for appraisal and to notify the property owner of the appointment. The system may transmit an instruction to a computing device associated with this other adjuster so that the other adjuster will receive the pertinent information about the claim and information regarding where and when to perform an in-person, physical inspection of the property.

After the determination is made, the owner's device may notify the owner that funds have already been deposited in an account of the owner, or that the appraisal via video call was unsuccessful and that an appointment has been or must be made for an in-person appraisal by another claims adjuster.

In an alternative embodiment, the system could instead be used for appraisal by a doctor or claims adjuster of an individual insured with health insurance rather than a property owner. In such an embodiment, skill types saved as attributes for members of the queue could be fields of medical expertise or other medical skills, rather than property types. The operator of the mobile device may be a doctor, another medical personnel, or other third party who may help a remote doctor or adjuster to inspect or perform a physical on a person submitting a health insurance claim.

FIG. 4A depicts a property owner initiating a video transmission of his or her damaged property. Before or after initiating communications, a property owner may take his or her mobile computing device to the location of damaged property 403 and align the mobile device such that the property is within the view window 402 of a camera of the mobile computing device 200.

Upon initiating the request (which may be made via an online system, mobile application executing on the mobile device 200, or the like), a user interface may be displayed to a claims adjuster. FIG. 4B depicts an example user interface 400 used by a claims adjuster when receiving a request from a property owner for two-way audiovisual communication. An adjuster, while waiting for an incoming call, may be able to see a live video stream 406 of the adjuster through a camera of her own computer to ensure that she is centered in frame and otherwise prepared for a face-to-face communication with a customer/property owner. She may also use status bar 404 to view her current status and to change that status. For example, an adjuster's status may be "Available", "In Video Call", "Wrap Up", "Unavailable", "Idle", "Logged Out", or a number of other statuses. A button marked "Change" or a similar label may be engaged to allow the adjuster to select a new status. Statuses may automatically change in response to actions or inactions, such as accepting a call, terminating a call, or not interacting with the user interface changing the status to "Unavailable", "Available", or "Idle", respectively.

When the incoming communications request causes the adjuster to be selected by the system, an incoming call window 405 may appear. The adjuster may accept the call by clicking an appropriate button within the window. The adjuster may decline the call either by clicking a decline button, which may be present, or by failing to accept the call within a predetermined period of time, such as 3 seconds, 5 seconds, or 10 seconds. In the event that the adjuster fails to accept the call, the call may be re-routed to the next available adjuster, such as by using the same logic that was used for the initial call connection.

FIG. 4C depicts an example user interface used by a claims adjuster to display the two-way audiovisual communication and to converse with the property owner. During the call, the adjuster may be able to see the damaged property 402. The adjuster may also be able to continue viewing herself 406 in a less prominent part of the user interface throughout the call. The adjuster may be able to continue adjusting her status mid-call via status bar 404, may mute her own microphone or turn off her camera with controls 408, and may view information 407 already received from the property owner before initiation of the call. The status bar may be used to end the call when the adjuster decides that sufficient information has been gathered.

FIGS. 5A-5F depict example user interfaces that may be used for a property owner to contact a claims adjuster and show property damage to the adjuster. The interfaces may be presented to the user via an online or mobile application executing on the mobile device 200 of the user.

Figure 5A:
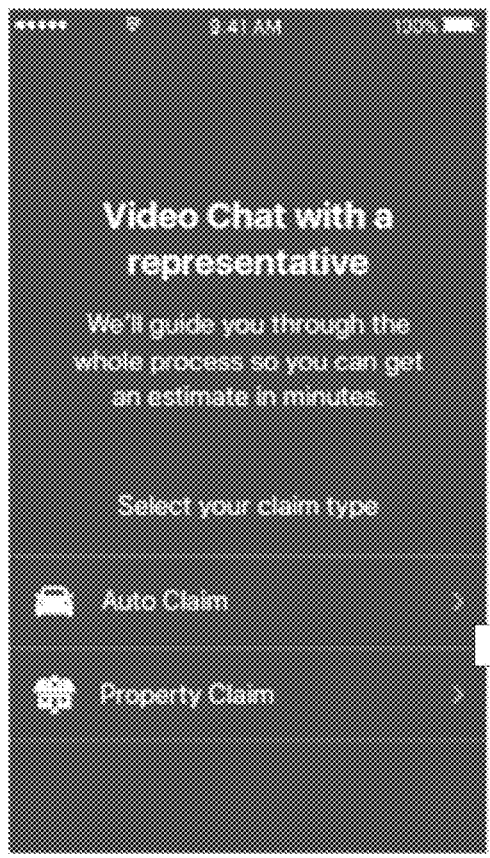
FIGS. 5A-F depict example user interfaces used for a property owner to contact an agent and display property damage to the agent according to one or more aspects described herein.

In FIG. 5A, a property owner may be prompted to select a property type 501 for the damaged property and progress to a next screen.

Figure 5B:
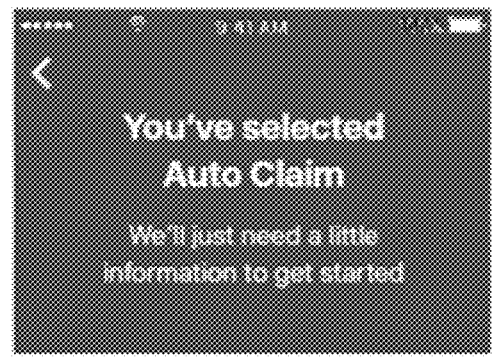

In FIG. 5B, the property owner may be prompted to enter one or more of a name, username, contact information, or a claim number 502. Alternatively, these fields may be pre-filled if the owner has already logged in and the system has access to a database containing recent claims filed for each customer. The owner may progress to a next screen via confirmation button 503.

Figure 5C:
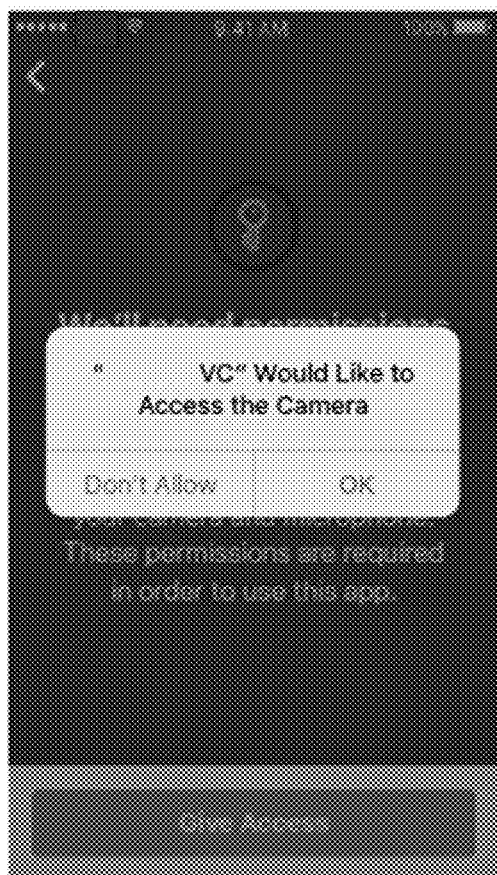

In FIG. 5C, the property owner may be prompted to authorize the use of a camera and/or a microphone of the mobile computing device 200. In response to allowance, the owner may progress to a next screen.

Figure 5D:
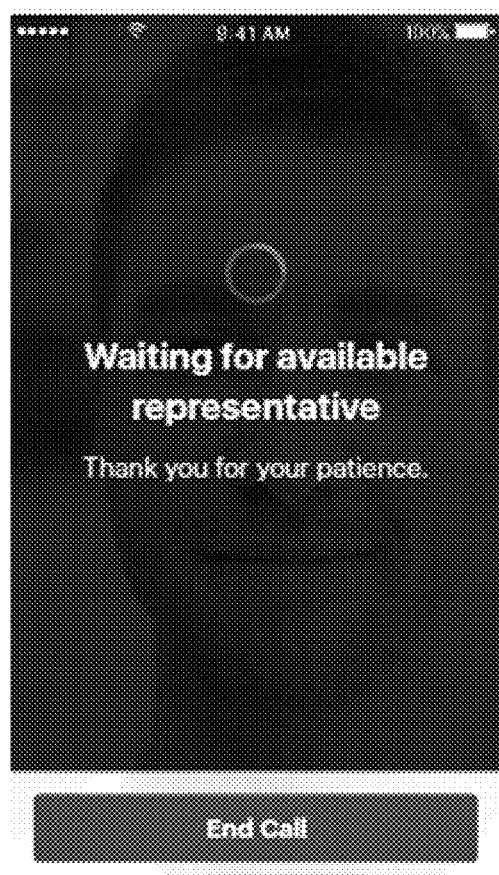

In FIG. 5D, the property owner may be notified that he will soon be connected to an adjuster. At this time, the request to initiate communications comprising the data 501 and/or 502 may be transmitted to the system, and steps 303 and the following may be performed.

Figure 5E:
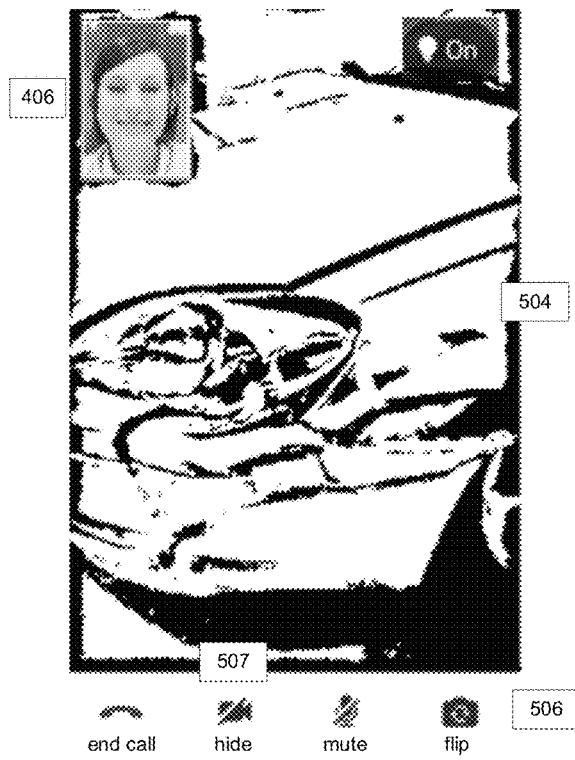
Figure 5F:

In FIG. 5E, the property owner may be able to view the video 504 being captured from a rear-facing camera of the mobile computing device as the owner speaks with the adjuster using the microphone, and/or views himself being captured (e.g., by a front-facing camera). The owner may further be able to view the video 406 of the adjuster in a less prominent position. In FIG. 5F, an alternative viewing configuration, the property owner may be able to view the video 406 of the adjuster most prominently and video 505 of himself in a less prominent position. Flipping button 506 may be used to switch between views of FIGS. 5E and 5F by causing the video feed to be provided from rear-facing camera 212 or front-facing camera 210 of mobile computing device 200. Controls 507 may be used to mute the microphone, turn off the camera, and/or end the call.

FIG. 6A depicts an example user interface for a queue manager to obtain information on the status of the queue. A table may be generated comprising one of more of a list of adjusters' names 601, adjusters' skills or other stored attributes 602, adjusters' statuses 603, and/or durations in the queue 604. The manager may further be able to see a "queue snapshot" 605 or other summary of queue statistics that may indicate a need for rebalancing of adjusters between queue types to improve customer service. In some instances, the table may be divided further based on whether an adjuster is assigned to a certain type of product (e.g., home, auto, boat, motorcycle, etc.) and/or sub-class of product and/or service (e.g., new drivers, basic service, luxury or exotic automobiles, vacation homes, rental properties or vehicles, etc.).

Figure 6B:
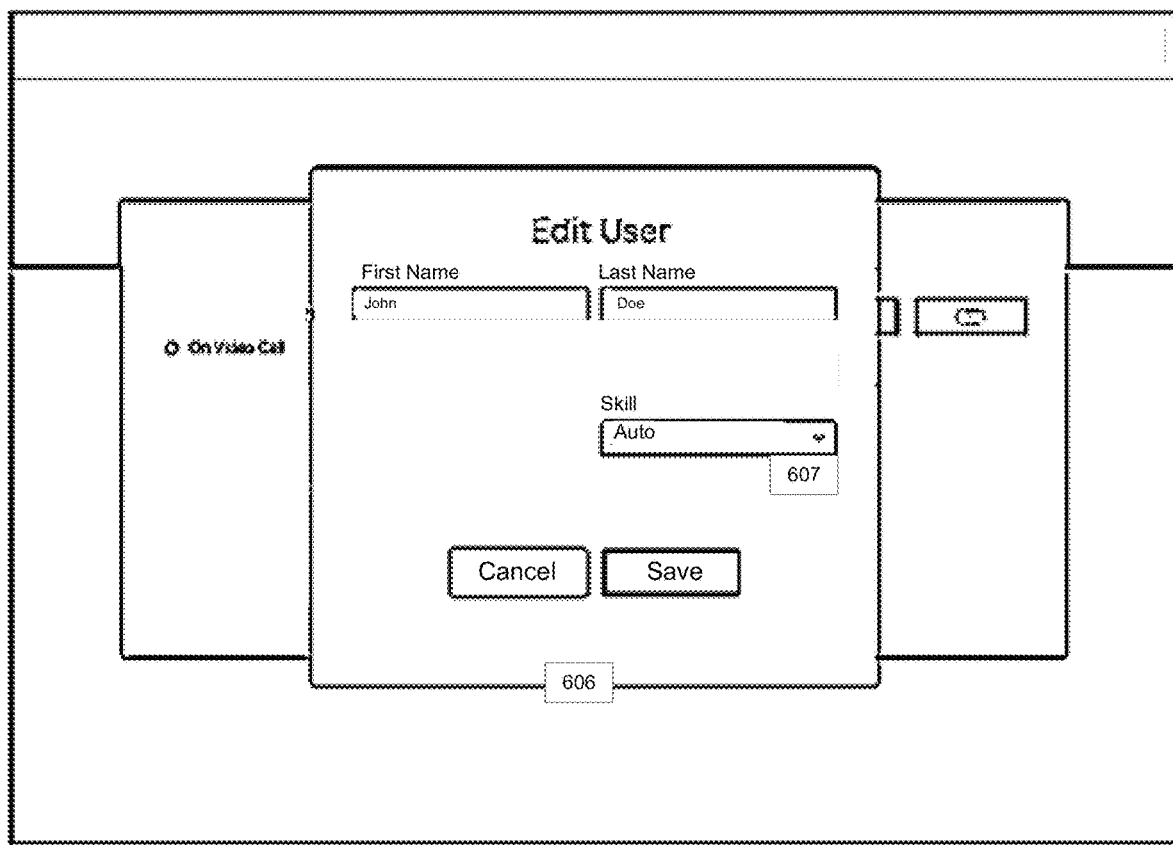
FIG. 6B depicts an example user interface used for a queue manager to add agents to a queue, edit agents' attributes, and/or reassign agents within a queue according to one or more aspects described herein.

FIG. 6B depicts an example user interface for a queue manager to add adjusters to a queue, edit adjusters' attributes, and/or reassign adjusters within a queue. Upon clicking or otherwise selecting one of the existing adjusters or a "new adjuster" button, a window 606 may appear, displaying stored information about the adjuster and allowing the manager to edit that information and save it. The manager may be able to change a stored skill 607 or other attribute of an adjuster in order to manipulate the queue; for example, if one skill is in higher demand and an adjuster has multiple skills, the manager may shift the adjuster's entry from a low demand skill to a high demand skill to balance out available adjusters with the composition of incoming calls. In some instances, a high demand skill may correspond to a primary skill, and a low demand skill may correspond to a secondary skill. In other instances, primary and secondary skills may be determined based on other factors, such as the value of a claim. For example, total loss claims may be rare (e.g., have low demand), but may be a primary skill because the value of claims in a total loss are higher than other claims that occur more frequently (e.g., "scratch and dent").

A manager may furthermore be able to view/listen in real time to an ongoing call between an adjuster and a property owner. When an adjuster who is currently "In Call" is selected, an option may appear to allow one-way audiovisual communication from the adjuster to the manager and/or from the owner to the manager. Accordingly, the manager may be able to ensure that adjusters are appropriately performing duties and helping owners, and may use the information for training purposes with the adjuster after the call.

Figure 7A:
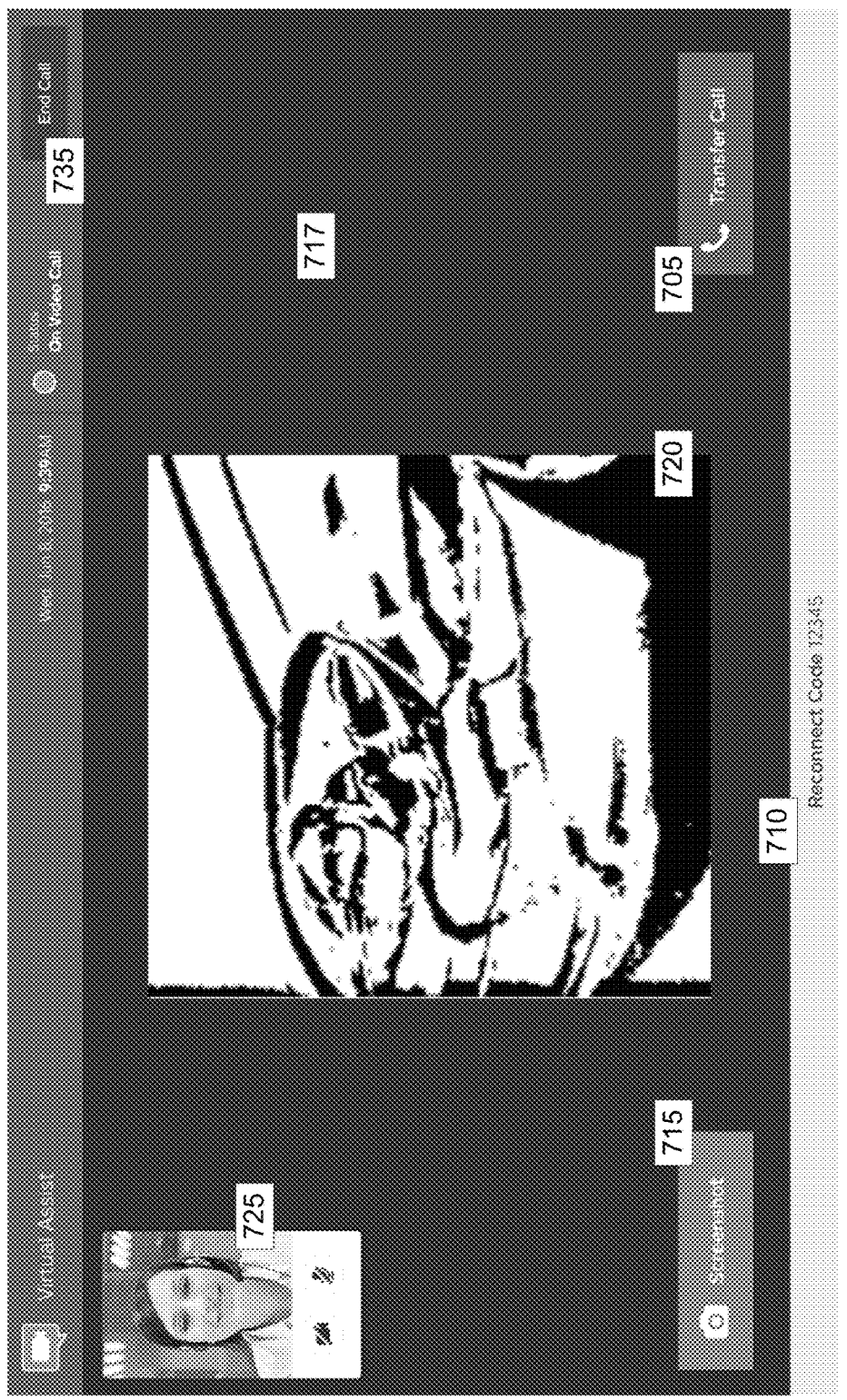
FIG. 7A depicts an example user interface for an agent who is communicating with a client according to one or more aspects described herein.

FIG. 7A depicts an example user interface for an adjuster who is communicating with a client. The interface may comprise a screen 717 that may depict a video or still image of property 720, a client requesting a claim, a body shop, or some other external entity. The agent may be in communication with the client using audio and/or video. A communication preview window 725 may allow the adjuster to see a depiction of himself as he communicates. The preview window 725 may comprise controls for muting video and/or audio. The adjuster may request a client to gather claim information. For example, a client may take video of a car. In some instances, the client may take still images. In some instances, the adjuster may be able to click a screenshot button 715 in order to take or capture a still image of the currently rendered video frame when appropriate. For example, an adjuster may ask a client to capture video of the front of a car that was in a collision. When the client has a useful angle for the video, the adjuster may take a screenshot using button 715. For example, the screenshot button may convert the current video frame into a still image, such as a .jpg file. In another example, the screenshot button may "burst" capture images at an interval (e.g., every 10 milliseconds) such that the adjuster may select images to keep at a wrap-up screen as described herein. In this manner, an adjuster may be able to capture images from client video with minimal action taken by a client, who may not be technically proficient.

In some instances, captured images may be displayed on the screen to the adjuster during an ongoing call. For example, previously captured images may appear as thumbnails on the screen while the video call is ongoing. In some instances, the adjuster may select a thumbnail in order to view an enlarged version of the image during the call. This may allow an adjuster to see what images have previously been taken in order to assist the adjuster in determining what further images should be taken (e.g., an adjuster may determine from the thumbnails that a certain portion of the bumper has not been captured in an image).

Figure 10:
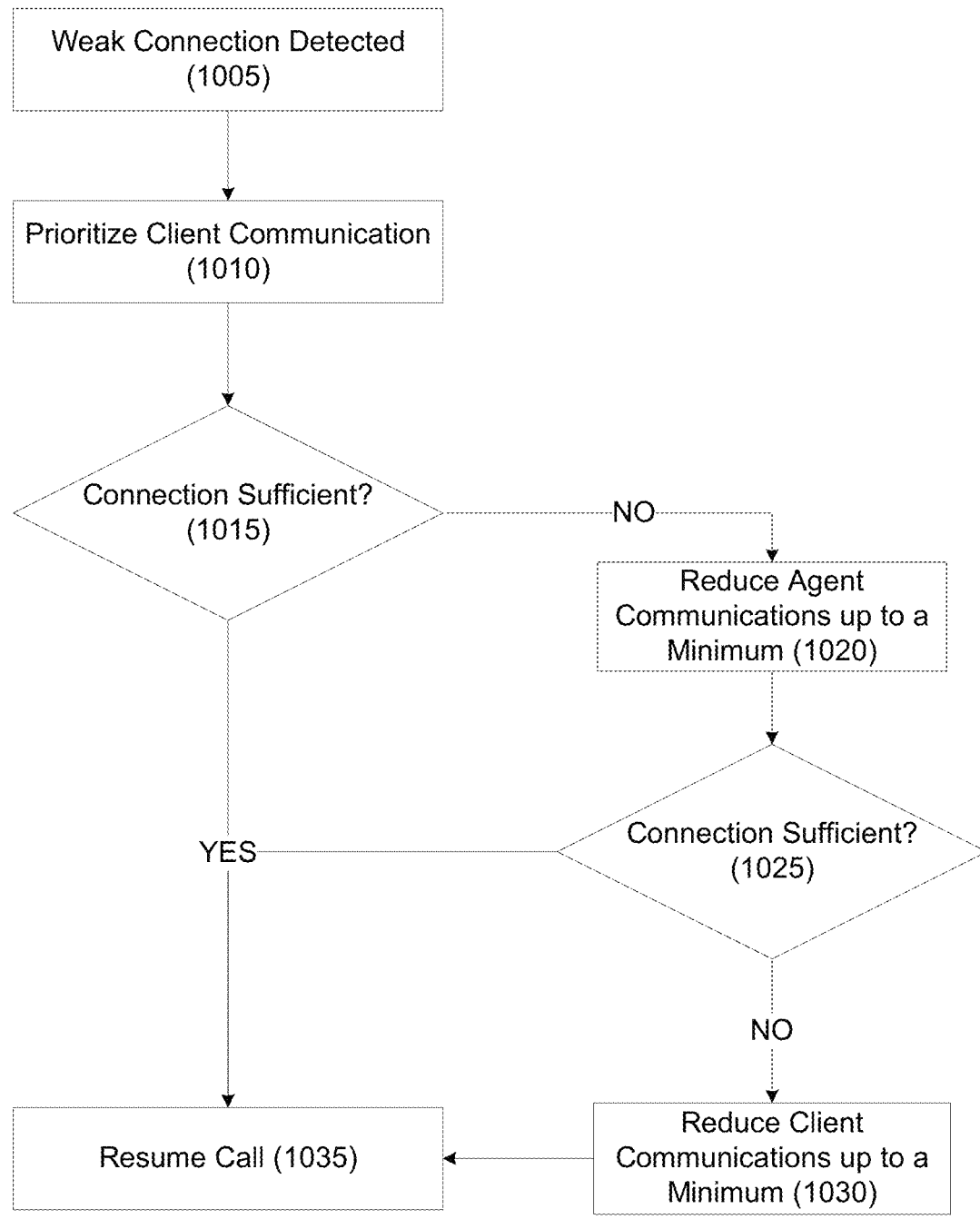
FIG. 10 depicts a flow diagram illustrating an example method for call degradation handling according to one or more aspects described herein.

Call degradation handling may assist in situations where connections are not ideal (e.g., intermittent connections, insufficient bandwidth, high jitter, etc.). An example method for call degradation handling is depicted in FIG. 10. A weak connection may be detected at step 1005. For example, a weak Internet connection may not permit maximum fidelity for video feeds by both the adjuster and the client. The system may detect the weak connection by checking for lost packets, judder, or insufficient bandwidth. In such instances, the system may wish to prioritize one communication over another in cases of limited resources (e.g., bandwidth, client device processing power, etc.). In some instances, prioritization may comprise reducing resources in one area to free up resources in another area. At step 1010 the system may prioritize communications with a client (e.g., communicating incoming from the client to the adjuster) in order to ensure video of damaged property is accurately captured. For example, an adjuster may be able to select an option to temporarily prioritize adjuster communication (e.g., outgoing communications from the adjuster to the client) so that an adjuster can explain information that the adjuster wants captured by the client. Communications may be prioritized in different ways. In some instances, communications may be disabled for one of the adjuster and/or the client. In other instances, video and/or audio quality may be reduced or restricted. For example, adjuster communications may have reduced resolution, reduced bitrate, and/or may be audio-only.

In some instances, the system may dynamically manage connection settings such that adjuster communications are restricted enough to maximize client communications in order to capture accurate descriptions of damaged property. For example, the system may determine that a connection is still insufficient for bilateral communication using current settings, perhaps even after performing some prioritization of client communications in step 1010, at step 1015. The system may dynamically reduce adjuster communications until a connection is stable by first reducing adjuster communications at step 1020 up to a predetermined minimum (e.g., to a minimum resolution, minimum bitrate, or to audio-only). If the system determines that the connection is still insufficient at step 1025, the system may reduce client communications at step 1030 up to a minimum (e.g., to another minimum resolution, to another minimum bitrate, or to audio-only). In this manner stable communications may be maintained while prioritizing some communications that are more important than others (e.g., video of vehicle damage is prioritized over video of a claims adjuster). Even after a call is resumed at step 1035, the system may continue monitoring the call and repeat the method to compensate for changing network conditions.

Referring back to FIG. 7A, a transfer call button 705 may allow an adjuster to transfer a call. As the system may route calls without logins, errors may occur where a call is routed to an inappropriate adjuster (e.g., a call may be sent to an adjuster for an incorrect property type or geographic area). For example, a call may be routed to an adjuster who is not properly licensed for a jurisdiction. The adjuster may realize that the client needs a properly licensed adjuster, and may click the transfer call button to route the call to an adjuster who is properly qualified to handle the call. The adjuster may select the proper department or send the client back to a call routing screen so that the client can route himself.

Figure 7B:
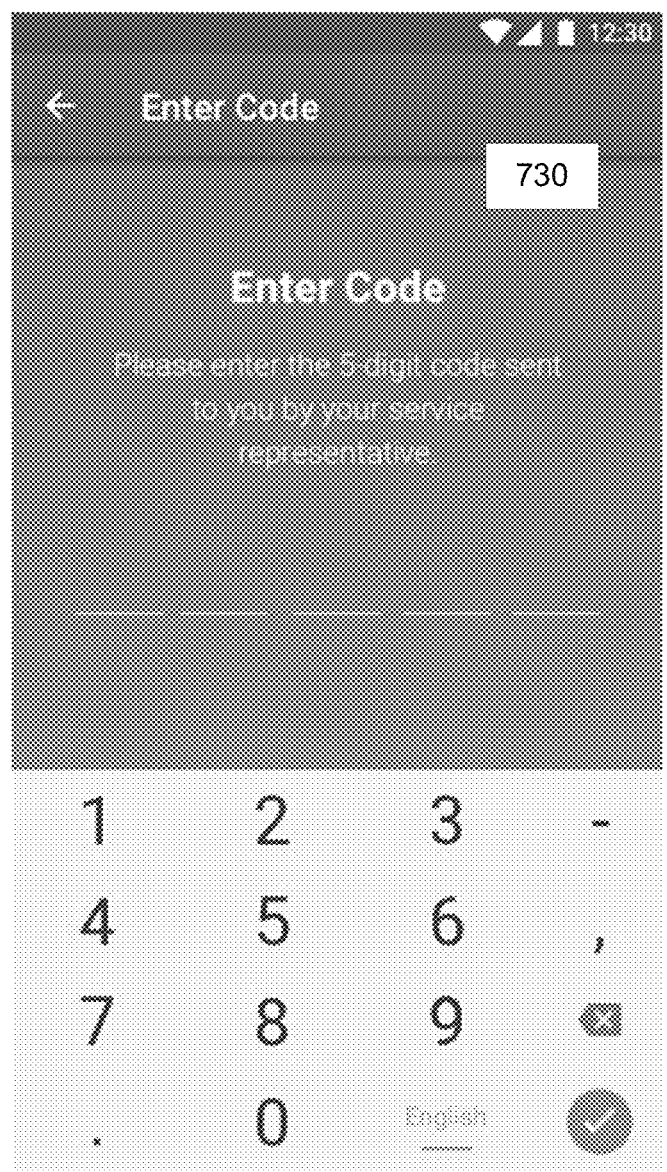
FIG. 7B depicts an example user interface for reconnecting a call according to one or more aspects described herein.

A reconnect feature may allow for calls to be reconnected in a login-free environment. In an Internet-based call without logins, a user may be routed based solely on information provided during the course of a call, as described herein. However, due to the dynamic nature of Internet communications, it may be very difficult to "call back" a customer (e.g., in the event of a loss of communication, desire to obtain additional information after a communication has ended, or the like) using the application without logins or some other identifier. Instead, an ad hoc reconnection method may be used. A reconnect code 710 may provide a means for reconnecting a call. During the initial call process, a client may provide alternative contact information, such as an e-mail or phone number. If a disconnect happens, the adjuster can send a message (e.g., a text message, notification, and/or email) comprising a reconnect code. For example, the adjuster may send the client a text message and/or an email, and/or the adjuster may use the application to trigger a notification of the code on the phone or other device of the customer. The client may enter the reconnect code in the application (e.g., application executing on the client phone or other device) to be connected back with the agent who was initially conducting the call. For example, a client may be disconnected. The adjuster may send the client a reconnect code. The client may enter the reconnect code in a screen such as the reconnection screen 730 depicted in FIG. 7B. The adjuster may wait at a holding screen for a threshold period of time in order for the client to reconnect. When the code is entered, then the system may reconnect the client with the adjuster (in the case of a notification, in some instances clicking the notification may enter the reconnect code automatically). This may prevent the client from inconveniently having to re-enter information or start a new call with a new adjuster. This may promote efficient and stress-free communication that improves the client experience and saves money by shortening the claim entry process.

In some instances, the reconnect code may be utilized to avoid long wait times in a login-free environment. If a client will experience a hold time of longer than a threshold (e.g., two minutes), then the system may automatically trigger a disconnection and initiate a reconnect when an adjuster is able to take the call. The system may monitor call wait times to determine if an unusually long wait times exist. If wait times exceed a threshold, then the system may present one or more clients with a screen comprising an option to request a "call back" (e.g., a screen indicating that the client may request to be called back by an adjuster rather than remaining on hold and waiting for the adjuster to take the call, and may display a "call back" button on the screen to initiate the call back feature). If the client selects the call back option, the system may disconnect the client, but maintain a ticket associated with the client in a queue associated with one or more adjusters. When the adjuster opens the ticket, the ticket may indicate that the client has requested a call back. The adjuster may then initiate a reconnect by using supplied contact information to send a message comprising a reconnection code for entering into the application, as described above, resulting in the client being connected directly with the adjuster who opened the ticket after the client enters the reconnection code. This may have the advantage of allowing a client to avoid holding for an adjuster while not requiring the client to re-enter information collected at the onset of a communication in a login-free environment.

Figure 8:
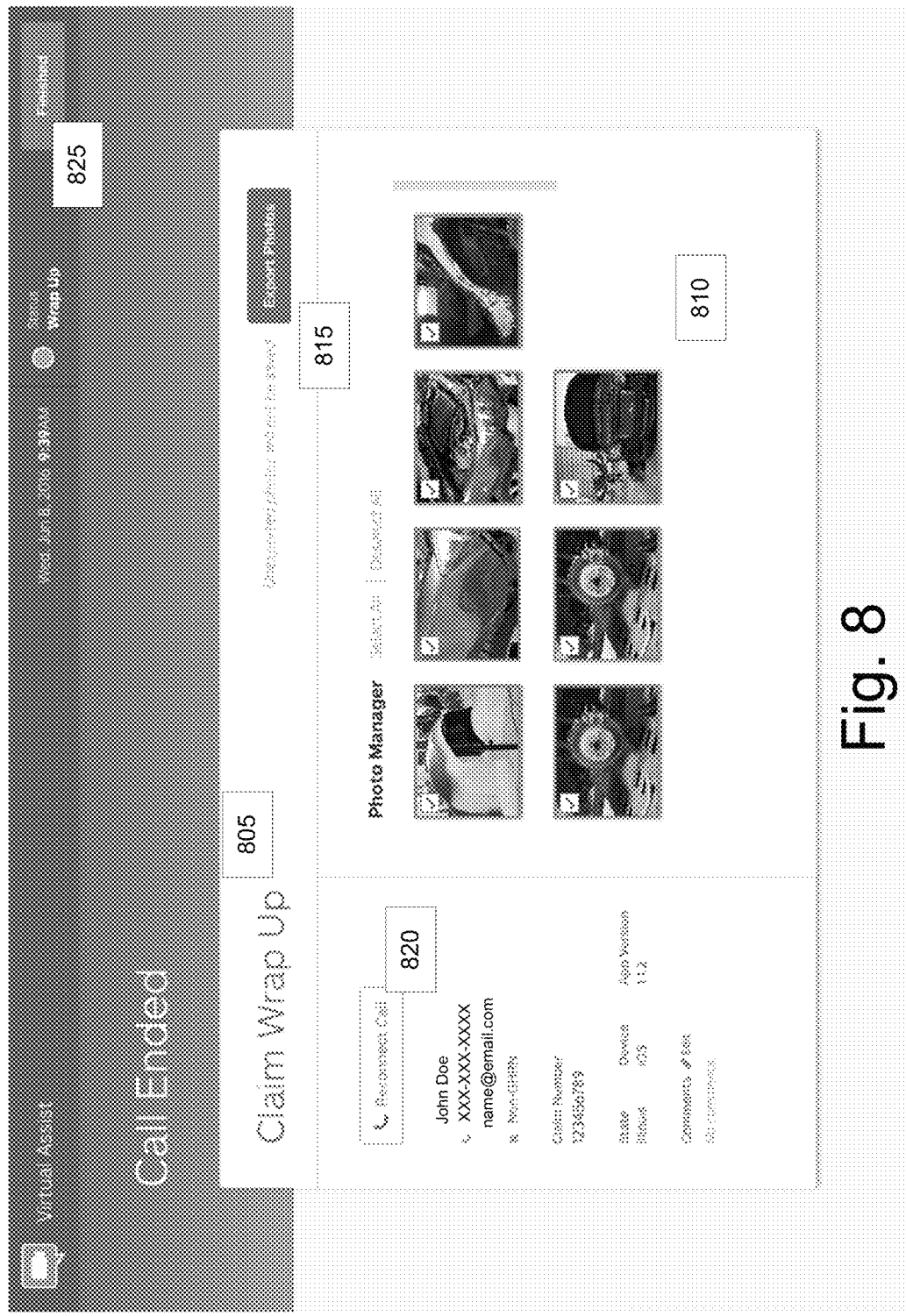
FIG. 8 depicts an example claim wrap up screen for viewing and entering claim information following a call according to one or more aspects described herein.

FIG. 8 depicts an example claim wrap up screen 805 where an adjuster may view claim information following a call. The claim wrap up screen may present gathered information 810 gathered as part of a call (e.g., descriptions of car type, collision type, collision speed, damage, where and how a collision took place, etc.). For example, the screen may present images (e.g., screenshots) taken as part of the call (such as screenshots taken as described above in FIG. 7A). In another example, the gathered information 810 may comprise other forms of information, such as textual information, videos, 3-dimensional scans and/or renderings (e.g., a 3D scan of a damaged vehicle taken with a phone or other device), audio files, and/or some other such information. An adjuster may be able to select from among the gathered information 810 to save using an export button 815. This may allow an adjuster to cull information in order to store worthwhile information without storing information that would provide clutter in an analytics environment and/or would take unnecessary storage space.

A reconnect call button 820 may allow an adjuster to reconnect a call. For example, a call may have ended prematurely or an adjuster may desire to collect additional information. The reconnect call button 820 may send a reconnect code as described above and/or redirect an agent to a call screen such as that depicted in FIG. 7A.

When an adjuster selects to finish a call, such as by clicking the finish call button 825, the adjuster may be asked to enter some summary information for the call. The summary information may comprise information about the type of call handled as well as the result. For example, a claims adjuster may type in a claim number for the call. In some instances, the claim number may not be provided automatically so that the system does not need to utilize hooks in other systems to authenticate the number (e.g., entering a claim number manually may allow the system to support claim numbers for many different companies without connections to additional databases). In some instances, the claim number may be correlated to the client and/or property. For example, the claim number may be associated with a vehicle using the application or an external process. The adjuster may also indicate a result. For example, the adjuster may indicate that the claim was approved, that the claim resulted in a total loss, that the claim was denied, etc. Information gathered by the application may be used as tags on the gathered information 810. For example, photos presented in the call may be flagged as photographs of total loss regarding an exotic automobile in Indiana. This may allow for the creation of a database of gathered information 810 sorted according to the tags. Such a database may be utilized as a data source to train machine learning for an automated claims processing system.

In some instances, the gathered information 810 may be packaged and transmitted to a specified organization (such as a company specified in step 910). The exported information may be combined with the summary information and sent to a data depository associated with the specified organization. The organization's depository may process the claim number, gathered information 810, and/or other information to sort and store information as the organization sees fit. In this manner, the system may allow for claims to be handled for a large number of organizations with minimal ties into client systems, as the information may be transmitted with minimal information required from the organization's systems. By reducing access to proprietary databases and networks maintained by partner organizations, the system can support those organizations while minimizing security risks (e.g., a system may be able to transmit information to an insurer database but not receive information from the insurer database, which may reduce the risk of the system being used to illicitly obtain confidential client information from the insurer database).

In some instances, it may be advantageous to allow an adjuster to take an additional call prior to finishing work in a first call (e.g., taking a second call while still entering summary information). The system may allow an adjuster to "pause" work on a first call in order to take the second call while minimizing lost work. The system may notify the adjuster that he or she is requested on an additional call, such as for high call volume. The system may then allow the adjuster's work to be stored as a saved state. In some instances, the adjuster may initiate saving the state of his or her work manually, and may do so with or without prompting of another incoming call. In some instances, the saving may be automatic, though the adjuster may be permitted to refuse a second call and/or decline pausing his or her work via a prompt. A saved state may comprise information indicating work done by the adjuster and/or the current state of the interface presented to the adjuster. The work done by the adjuster, which may be information entered by the adjuster (e.g., summary information, claim notes, annotations, etc.) may be stored as data locally or remotely. The current state of the interface may be information indicating the information as visually depicted to the adjuster and/or underlying information entered by the adjuster. This information may be stored locally or remotely.

An adjuster may resume a previous saved state by loading the saved state. Upon loading the saved state, the adjuster may be presented with the interface as was visually presented to the adjuster when the state was saved. For example, an adjuster may take a first call, begin entering summary information, accept a second call (which automatically saves his state), and then load his saved state after finishing his second call. The loaded state information may populate any or all fields previously populated by the adjuster, make any selections made by the adjuster, present any visual information (e.g., selected images) in the manner they were previously depicted, and/or may recreate the state of the interface upon saving (e.g., if a photograph was highlighted and/or selected at the time the state was saved, it may be highlighted and/or selected upon loading).

Figure 9:
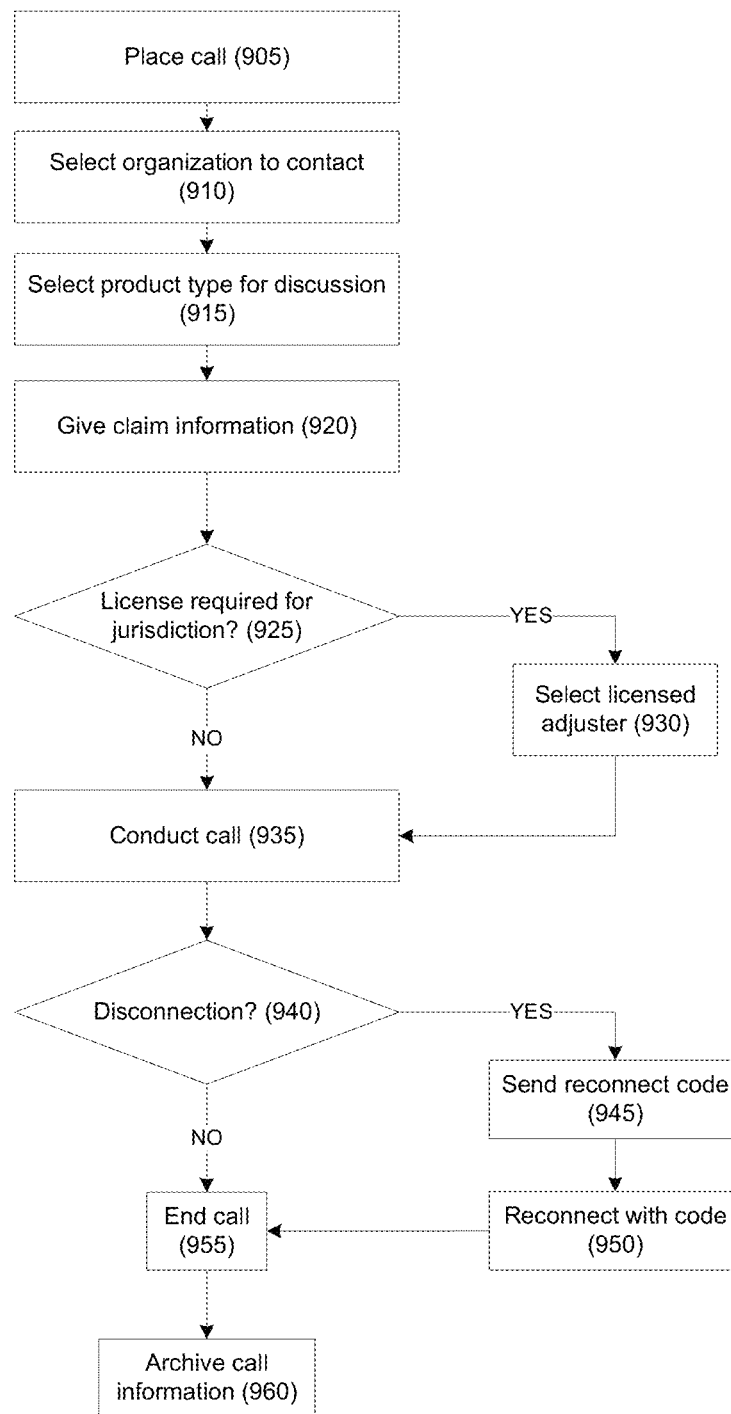
FIG. 9 depicts a flow diagram illustrating an example method for placing, maintaining, and ending a call according to one or more aspects described herein.

FIG. 9 depicts a flow diagram illustrating an example method for placing, maintaining, and ending a call consistent with the systems and methods described herein. At step 905, a client may place a call to an adjuster using a device using the methods and/or systems described herein. For example, a client who was involved in a collision may use an application (e.g., an application executing on a mobile computing device 200) to contact a claims adjuster (e.g., a claims adjuster using an application executing on a computing device 107) following a collision (such as by using the application depicted in FIGS. 5A-5F). In another example, a repair facility or body shop may initiate the call. Some or all of the illustrated steps may be performed by a computing device, such as virtual collaboration server 103 illustrated in FIG. 1, executing instructions stored on a computer-readable medium.

The client may select an organization to contact at step 910. In some instances, the application may support multiple companies and/or insurance carriers. For example, the application may be licensed for use by multiple companies as a standardized application that is routed using a selection (e.g., a client may select his personal insurance carrier using a drop-down box).

At step 915, the client may select a product type for discussion. A company may provide services regarding a number of different types of products (e.g., home, auto, boat, motorcycle, etc.) or sub-classes of products and/or services (e.g., new drivers, senior citizens, basic or economy service, luxury or exotic automobiles, vacation homes, rental properties or vehicles, etc.). This may be used to route a call to an adjuster who is qualified and/or specialized for the call. For example, some adjusters may specialize in exotic vehicles. In another example, new drivers may be redirected to agents who specialize in helping young or inexperienced drivers with the claims process.

At step 920, the client may provide claim information. The claim information may provide additional details of the claim that may be useful in initiating the call. For example, the client may provide a geographic location regarding where they reside or where a collision took place (e.g., by selecting a state from a drop down list when initiating the call). Certain geographic locations may have associated licensing or qualification requirements. By gathering this information at the onset, the system may select an adjuster who is properly qualified to handle the call at step 930. The system may then route the call to a qualified adjuster.

At step 935, an adjuster selected according to the systems and/or methods described herein may be connected to the client and conduct the call. For example, a client may be routed to a licensed adjuster who handles rental properties based on information provided in steps 915 and 920.

In some instances, a client may receive feedback regarding and/or based on established hours of operation. Adjusters in a group assigned to handle a call may have limited hours. In one example, all adjusters for a company and/or insurance carrier may work from 8 AM to 5 PM Eastern. In another example, adjusters for another company assigned to handle exotic automobiles may have special hours and be available from 6 AM until 9 PM Eastern. The system may cause a message to be displayed to a client indicating that adjusters are unavailable during a particular time of day. This indication may only be displayed when adjusters are unavailable due to the timing of a client call. For example, if a user selects a company with uniform hours, the client may be notified that a call is after hours and be further notified of when the adjusters are normally available. This notification may be sent after selecting the company to call but before proceeding to one or more further steps, as it may be known that no adjuster will be available regardless of the product type to be discussed. In another example where adjuster times vary depending on where the call is routed (e.g., adjusters for different product types keep different hours), the system may wait until the client enters more specific information (e.g., product type, geographic area, sub-class of product, etc.) in order to give the hours for the correct set of adjusters. This may allow a client to quickly identify when he should call back while reducing the amount of information that a client must provide before he is notified that his call cannot be completed at a given time (e.g., a client may not need to enter claim information before being notified that it is after hours and no adjuster is available).

At step 940, the system may determine if there has been a disconnection. The system may detect disconnections that occur during the process of a call, and/or ask if there has been a disconnection when a call has been terminated. If a disconnection has been detected, the system may send a reconnect code at step 945. For example, the system may send a text message comprising a reconnection code to a phone number gathered from the client at step 920. In some examples, the reconnection code may be transmitted automatically upon detecting a disconnection. The system may receive the reconnect code at step 950 and reconnect the call. For example, a client may reopen the application and enter a code received in a text message. The system may then reconnect with an adjuster who has been waiting for the connection to be reinitiated. Further description of disconnections may be found in FIGS. 7A, 7B, and 8.

In some example cases of a disconnection, a state may be saved (such as described above). For example, upon disconnection the system may prompt the adjuster that a disconnection has occurred. The adjuster may be presented with the option of sending the reconnect code, and/or of saving the current state. In some instances, the adjuster may be permitted to send a reconnect code, continue working for a time, and then save the state of his or her work. Saving the state upon disconnection may occur automatically when a reconnect code is generated. Upon resuming the call, the system may automatically load the saved state. This may have the advantage of allowing the adjuster to pick up where he or she left off with a disconnected call without requiring the adjuster to keep a call active to preserve his or her work.

At step 955, the system may end the call. For example, an adjuster may end a call by clicking an end call button 735. The system may then archive call information such as by using a claim wrap up screen 805. This information may be used to create a database of call information. Information taken during calls may be stored in a database and sorted using information gathered as part of the call process. For example, photographs of a damaged vehicle may be stored in a database for damage claims of exotic vehicles. Call metrics may also be recorded. For example, the system may track the average duration of calls by each adjuster, including time spent waiting for calls, handling calls, reconnecting, wrapping up calls, etc. This may allow for managers to perform quality control measures (e.g., reassigning adjusters to areas of need, training adjusters who are inefficient, etc.).

Figure 11:
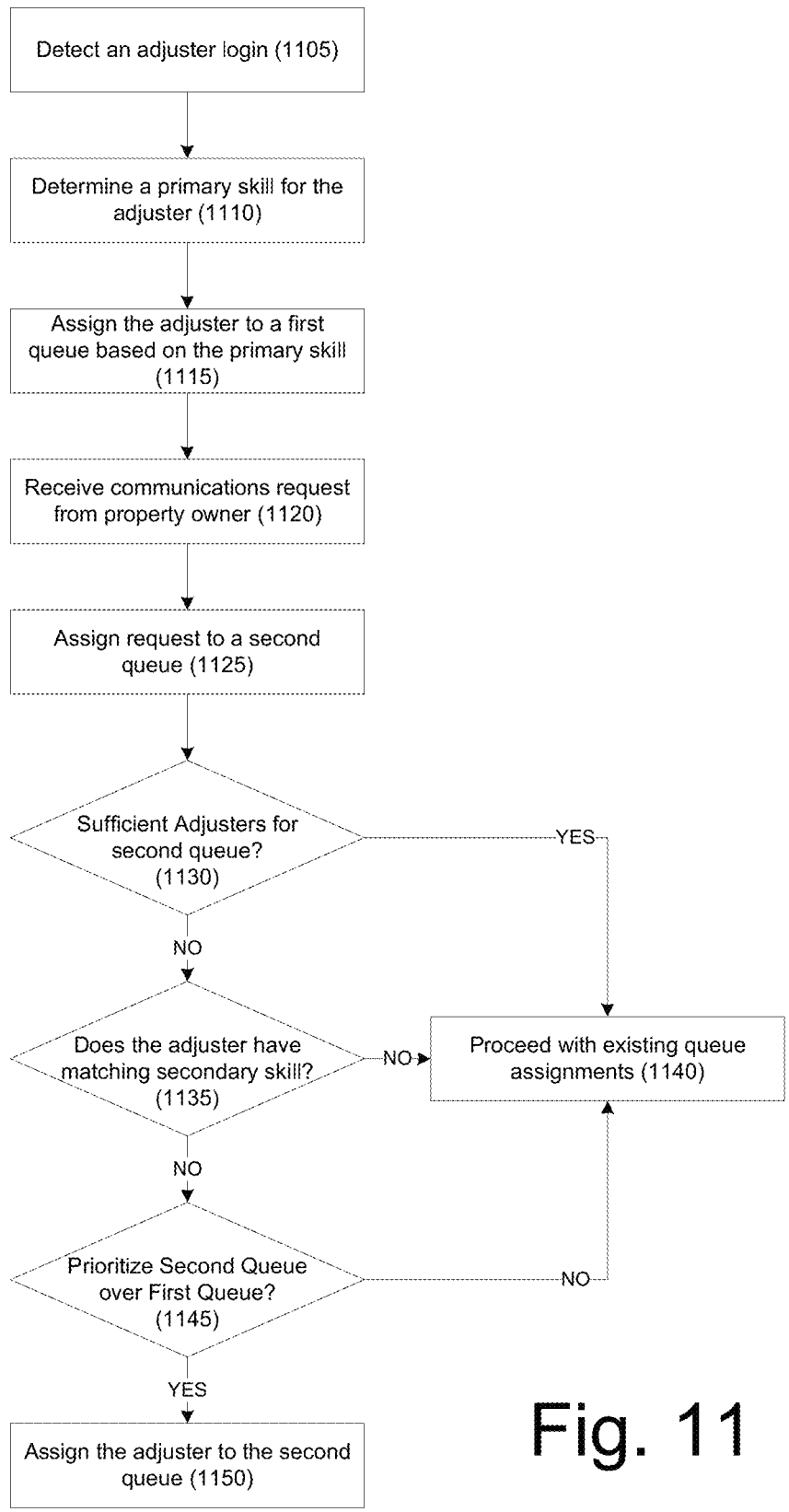
FIG. 11 depicts a flow diagram illustrating an example method for balancing one or more queues.

FIG. 11 depicts a flow diagram illustrating an example method for balancing one or more queues based on primary and secondary skills. At step 1105, the system may detect an adjuster connecting to the system. The adjuster may "log in" or be otherwise connected as discussed above. For example, a client who was involved in a collision may use an application (e.g., an application executing on a mobile computing device 200) to contact a claims adjuster (e.g., a claims adjuster using an application executing on a computing device 107) following a collision (such as by using the application depicted in FIGS. 5A-5F). In another example, a repair facility or body shop may initiate the call. Some or all of the illustrated steps may be performed by a computing device, such as virtual collaboration server 103 illustrated in FIG. 1, executing instructions stored on a computer-readable medium.

At step 1110, the system may determine a primary skill for the adjuster. A database associated with the system (e.g., a database 129) may store indications of primary and/or secondary skills associated with one or more adjusters. The indications may be preconfigured (e.g., a manager may preconfigure a login and associated primary skill for the adjuster). In some instances, primary and/or secondary skills may be automatically configured. For example, the system may assign a primary skill to an adjuster based on a weighted formula (e.g., weighting more valuable skills over less valuable skills), wherein the skills are weighted according to one or more factors (e.g., number of calls handled for each skill, average monetary value of a claim for each skill, etc.). In some instances, the system may use a combination of pre-configured and automatically generated skills (e.g., an adjuster may be configured with a primary skill in in hail damage at a first time, but may be given a primary skill in exotic cars once the adjuster handles enough exotic car claims).

At step 1115, an adjuster may be assigned to a first queue based on his or her primary skill. The first queue may be a call queue for adjusters, which may be consistent with one or more queues as discussed above. A first queue may have an assigned skill, and adjusters with a primary skill matching the first queue's skill may be assigned to the first queue. For example, adjusters with a primary skill of "hail damage" may be assigned to a "hail damage queue" upon initial login. A single queue may be associated with a plurality of skills. For example, the first queue may be assigned for adjusters with a primary skill in hail damage or tree damage. The assignments for a queue may be based on a combination of one or more skills. For example, the first queue may be assigned for adjusters with a primary skill of exotic automobiles or adjusters with both a primary skill in collision claims and a secondary skill in exotic automobiles.

At step 1120, the system may receive a request from a property owner. The request may comprise a communication requests associated with a claim, and the claim may be associated with a property type. More discussion of requests may be found above, such as in the discussion above regarding FIG. 3. At step 1125, the request may be assigned to a second queue. For example, the first queue may be exotic automobiles, and the second queue may be hail damage.

At step 1130, the system may determine if there are sufficient adjusters for the second queue. The system may use one or more factors to determine if there are sufficient adjusters (e.g., hold times, number of calls on hold, number of call requests, etc.). If the system determines that there is not a sufficient number of adjusters, then the system may proceed with determining if adjusters should be reassigned (e.g., steps 1135, 1145, and 1150). If the number of adjusters is sufficient in the second queue, then the call may be assigned based on the existing queue assignments at step 1140. Step 1140 may correspond to one or more methods and/or systems described herein, such as steps 303 to 309.

At step 1135, the system may determine if one or more adjusters are available to switch to the second queue. The system may determine if adjusters have a secondary skill that corresponds to a skill associated with the second queue. If such adjusters exist, then the system may determine if it should assign them at step 1145. Else, the system may proceed with existing queue assignments as in step 1140.

At step 1145, the system may determine whether to prioritize the second queue over the first queue. The adjuster may be assigned to the first queue based on a primary skill. If the adjuster is moved to the second queue based on his secondary skill, it will deprive the first queue of an adjuster. So the system may determine if such a reassignment is beneficial. The system may compare one or more factors of each queue in reaching this determination. For example, the system may compare the weight times of each queue, the number of calls handled by each queue, the monetary value of a claim in each queue, the monetary value of a policy handled by each queue, the number of people on hold in each queue, or any such factor (alone or in combination). If the system determines that the comparison favors the first queue, then the adjuster may not be reassigned and the system may proceed with existing queue assignments as in step 1140. If the system determines that reassigning an adjuster to the second queue from the first queue is beneficial, then the system may proceed with the reassignment at step 1150.

At step 1150, the system may reassign the adjuster to the second queue. In some instances, the reassignment may be for a limited duration (e.g., a limited duration of time, until weight times fall below a threshold, until a certain number of calls are handled by the adjuster, until the adjuster logs off, etc.). In some instances, the system may choose to move a reassigned adjuster back to a first queue due to insufficiencies related to the first queue. For example, prior to looking for secondary skills, if the system detects that there are insufficient adjusters for the first queue it may undo one or more reassignments of adjusters from the first queue to other queues. In some instances, the system may manage reassignments such that queue lengths are relatively equal. For example, one or more adjusters may be moved from a first queue with a first weight time to a second queue with a second weight time, wherein the second weight time is longer than the first weight time. When the second weight time becomes the same or lower than the first weight time, the system may reverse one or more reassignments to maintain balance across the queues. In some instances, the reassignment may be overridden. For example, when the system determines that an adjuster should be reassigned, a prompt may be provided to an individual (e.g., the adjuster or a manager) that allows the individual to accept or deny the reassignment.

Figure 12:
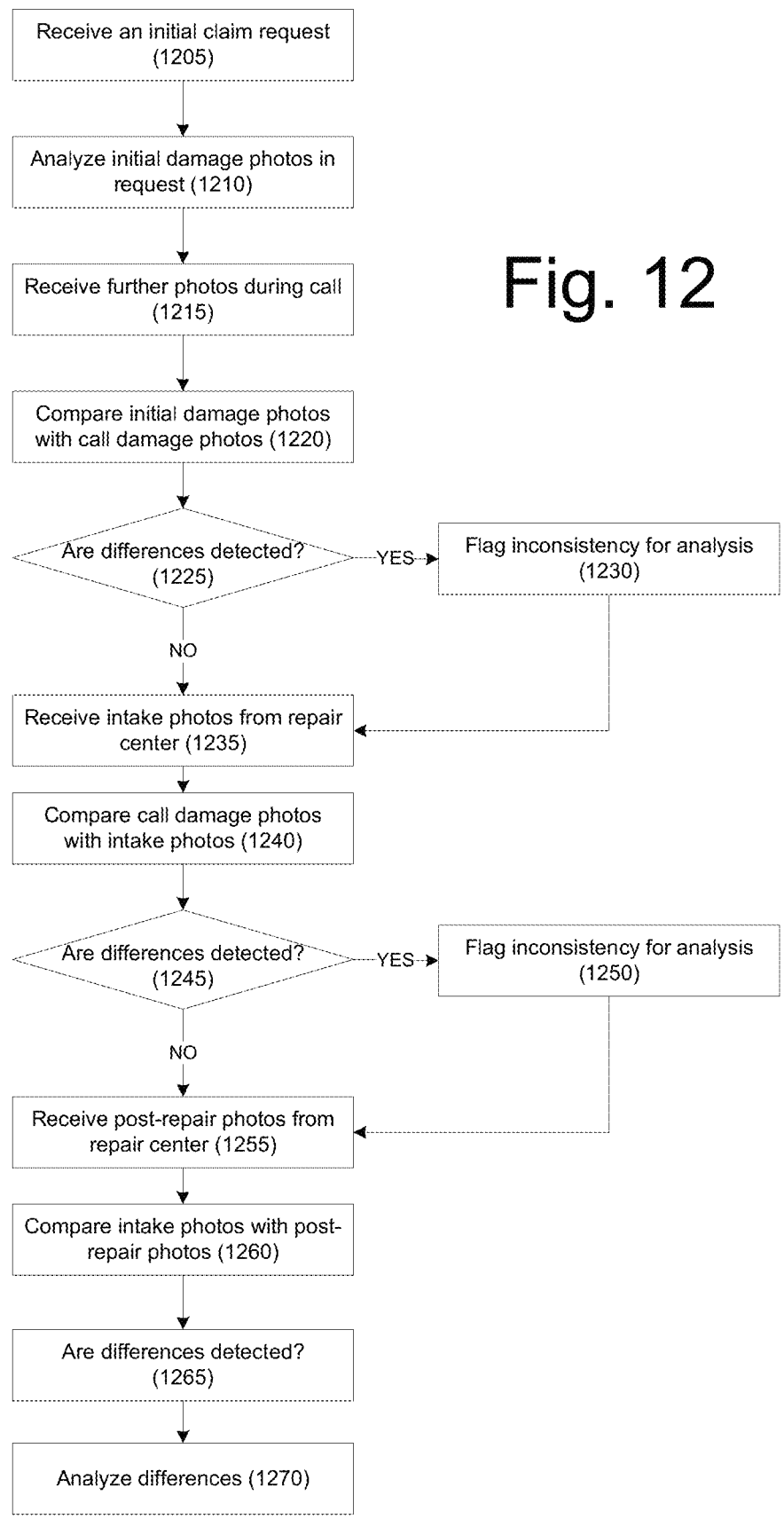
FIG. 12 depicts a flow diagram illustrating an example method for detecting claim inconsistencies.

FIG. 12 depicts a flow diagram illustrating an example method for detecting claim inconsistencies based on photos collected according to the systems and/or methods described herein. A system may analyze photographs taken at multiple points in a claim process in order to determine if fraudulent claims for damage and/or repair are being made. At step 1205, the system may receive an initial claim request, such as a claim request as discussed in FIG. 3 or FIG. 9. For example, a client who was involved in a collision may use an application (e.g., an application executing on a mobile computing device 200) to contact a claims adjuster (e.g., a claims adjuster using an application executing on a computing device 107) following a collision (such as by using the application depicted in FIGS. 5A-5F). In another example, a repair facility or body shop may initiate the call. Some or all of the illustrated steps may be performed by a computing device, such as virtual collaboration server 103 illustrated in FIG. 1, executing instructions stored on a computer-readable medium.

At step 1210, the system may analyze initial damage photos in a request. For example, the system may store photos submitted at the time of a collision and/or received with an initial request to initiate communication for a claim. Other forms of data capture may be substituted for photos throughout as appropriate, such as video or three-dimensional surface capture. The analysis may comprise indexing one or more instances of damage associated with property. For example, the system may determine one or more instances of hail damage in the image. The analysis may be performed using machine learning. The analysis may be performed in conjunction with an automated indexing system, such as a system for imaging vehicle damage as depicted in FIG. 4A.

At step 1215, the system may receive further photos as part of a call. For example, the system may receive further photos as discussed regarding step 307 of FIG. 3 or as discussed regarding FIG. 4A.

At step 1220, the system may compare the initial damage photos received in step 1210 with the call damage photos received at step 1220. The system may determine if any evidence of damage in the initially received photos corresponds with the damage in the photos in the later call. For example, the system may determine if there are additional dents in the call photos that were not present in the initial damage photos. The system may also compare the photos for other inconsistencies. For example, the system may analyze the photos to determine if the initial damage photos were of the same vehicle that is depicted during the call. If there are differences detected at step 1225, the system may flag inconsistencies for further analysis at step 1230. For example, the if the system detects that additional damage may have occurred to the vehicle, then the system may flag the photos for further automated or manually analysis in order to determine if fraud has occurred.

At step 1235, the system may receive photos taken at intake from a repair center. For example, a repair center may take photos of a car when it is received. These photos may be compared with the call damage photos and/or the initial damage photos in order to determine if there are inconsistencies. The system may detect, at step 1245, if there are differences. For example, there could be intervening damage and/or the vehicle may not be the vehicle shown during the call. If there are differences detected at step 1245, the system may flag inconsistencies for further analysis at step 1250. For example, if the system detects that there has been inadvertent damage, then the system may flag the photos for further automated or manual analysis in order to determine if fraud has occurred. This may have the advantage of preventing a customer from fraudulent obtaining repairs. In another example, the system may detect that damage from the call is not present, or that a different vehicle is at repair than was in the call, which may prevent a client and/or repair shop from committing insurance fraud.

At step 1255, the system may receive post-repair photos from a repair center. For example, the repair center may submit photos of a vehicle after having completed their contracted repairs. At step 1265, the system may determine differences between the repaired vehicle and the photos taken prior to the repair. The system may determine if one or more instances of damage flagged for repair have been addressed and repaired. For example, the system may determine if several instances of hail damage that had requested repair were sufficiently repaired. The photos may also be used at a later time as evidence that repairs were completed.

At step 1270, the system may analyze the differences before and after repair. For example, the system may determine that one or more instances of hail damage were not repaired. In another example, the system may determine that differences from intake photos indicate that the repair shop further damaged a vehicle. These differences may be flagged for further analysis based on the situation. For example, the system may flag a failure to properly repair a vehicle for agent review. In another example, the system may flag any damage suspected to be caused by the repair shop for further review. If the differences correspond to damage that was successfully repaired, no further action may be taken. In some instances, any issues detected during 1270 may be required to be resolved (e.g., by an agent) prior to issuing payment to a repair center.

While the aspects described herein have been discussed with respect to specific examples, including various modes of carrying out aspects of the disclosure, those skilled in the art will appreciate that there are numerous variations and permutations of the above-described systems and techniques that fall within the spirit and scope of the invention.

We claim:

1. A method comprising:
   receiving, by a virtual collaboration server and from a computing device, a request to initiate a communication session regarding a damaged property, wherein the request comprises an indication of a claim type for a certain type of product or service;
   determining, by the virtual collaboration server, a number of available first agents in a first queue, wherein the first agents have a primary skill indicator associated with the claim type;
   determining, by the virtual collaboration server, that the number of available first agents is below a threshold;
   determining, by the virtual collaboration server, based on the determining that the number of available first agents is below a threshold and based on a secondary skill indicator, one or more second agents assigned to one or more other queues, wherein the one or more second agents are associated with the secondary skill indicator, and wherein the secondary skill indicator is associated with the claim type;
   reassigning, by the virtual collaboration server and based on the determining the one or more second agents, the one or more second agents from the one or more other queues to the first queue;
   assigning, by the virtual collaboration server, and from the first agents and the reassigned one or more second agents, an agent to the communication session;

responsive to receiving an indication that the agent has accepted the request to initiate the communication session, initiating a bidirectional transmission of video and audio between the computing device and an additional computing device; and
   responsive to receiving, by the virtual collaboration server, an indication of insufficient connection for the bidirectional transmission, reducing, by the virtual collaboration server, either an agent communication transmission or a client communication transmission between the additional computing device and the computing device until the connection is sufficient for the bidirectional transmission.

2. The method of claim 1, wherein the request comprises a response to a personalized link, and wherein the personalized link comprises an indication of:
   an individual associated with the computing device; and
   the claim type.

3. The method of claim 1, wherein the request comprises one or more first images of damaged property for evaluation, and further comprising:
   transmitting the one or more first images of damaged property for storage by a database external to the virtual collaboration server.

4. The method of claim 3, wherein the video comprises one or more second images of the damaged property for evaluation, and further comprising:
   transmitting the one or more second images of the damaged property for storage by the database.

5. The method of claim 4, further comprising determining an instance of fraud based on comparing the one or more first images with the one or more second images.

6. The method of claim 1, wherein the reducing either the agent communication transmission or the client communication transmission between the additional computing device and the computing device comprises reducing a bitrate of the transmissions between the additional computing device and the computing device, wherein the bitrate is proportional to a quality of transmission.

7. The method of claim 1, wherein the request to initiate the communication session regarding the damaged property comprises a request to initiate the communication session using a login-free connection.

8. An apparatus, comprising:
   one or more processors; and
   memory storing instructions, the instructions when executed by the one or more processors, cause the apparatus to:
      receive, by a virtual collaboration server and from a computing device, a request to initiate a communication session regarding a damaged property, wherein the request comprises an indication of a claim type for a certain type of product or service;
      determine, by the virtual collaboration server, a number of available first agents in a first queue, wherein the first agents have a primary skill indicator associated with the claim type;
      determine, by the virtual collaboration server, that the number of available first agents is below a threshold;
      determine, by the virtual collaboration server, based on the determining that the number of available first agents is below a threshold and based on a secondary skill indicator, one or more second agents assigned to one or more other queues, wherein the one or more second agents are associated with the secondary skill indicator, and wherein the secondary skill indicator is associated with the claim type;

reassign, by the virtual collaboration server and based on the determining the one or more second agents, the one or more second agents from the one or more other queues to the first queue;

assign, by the virtual collaboration server, and from the first agents and the reassigned one or more second agents, an agent to the communication session; and responsive to receiving an indication that the agent has accepted the request to initiate the communication session, initiating a bidirectional transmission of video and audio between the computing device and an additional computing device; and responsive to receiving an indication of insufficient connection for the bidirectional transmission, reducing either an agent communication transmission or a client communication transmission between the additional computing device and the computing device until the communication is sufficient for the bidirectional transmission.

9. The apparatus of claim 8, wherein the request comprises a response to a personalized link, and wherein the personalized link comprises an indication of:
an individual associated with the computing device; and
the claim type.

10. The apparatus of claim 8, wherein the request comprises one or more first images of damaged property for evaluation, and further comprising:
transmitting the one or more first images of damaged property for storage by a database external to the virtual collaboration server.

11. The apparatus of claim 10, wherein the video comprises one or more second images of the damaged property for evaluation, and wherein the instructions, when executed by the one or more processors, cause the apparatus to:
transmit the one or more second images of the damaged property for storage by the database.

12. The apparatus of claim 11, wherein the instructions, when executed by the one or more processors, cause the apparatus to determine an instance of fraud based on comparing the one or more first images with the one or more second images.

13. The apparatus of claim 8, wherein the instructions, when executed by the one or more processors, cause the apparatus to reduce either the agent communication transmission or the client communication transmission between the additional computing device and the computing device by reducing a bitrate of the transmissions between the additional computing device and the computing device, wherein the bitrate is proportional to a quality of transmission.

14. The apparatus of claim 8, wherein the request to initiate the communication session regarding the damaged property comprises a request to initiate the communication session using a login-free connection.

15. One or more non-transitory computer-readable media comprising computer-executable instructions stored thereon, the instructions, when executed by a processor, configured to perform operations comprising:
receiving, by a virtual collaboration server and from a mobile computing device, a request to initiate a communication session regarding a damaged property, wherein the request comprises an indication of a claim type for a certain type of product or service;

determining, by the virtual collaboration server, a number of available first agents in a first queue, wherein the first agents have a primary skill indicator associated with the claim type;

determining, by the virtual collaboration server, that the number of available first agents is below a threshold;

determining, by the virtual collaboration server, based on the determining that the number of available first agents is below a threshold and based on a secondary skill indicator, one or more second agents assigned to one or more other queues, wherein the one or more second agents are associated with the secondary skill indicator, and wherein the secondary skill indicator is associated with the claim type;

reassigning, by the virtual collaboration server and based on the determining the one or more second agents, the one or more second agents from the one or more other queues to the first queue;

assigning, by the virtual collaboration server, and from the first agents and the reassigned one or more second agents, an agent to the communication session; and responsive to receiving an indication that the agent has accepted the request to initiate the communication session, initiating a bidirectional transmission of video and audio between the mobile computing device and a computing device associated with the agent; and in response to receiving an indication of insufficient connection for the bidirectional transmission, reducing either an agent communication transmission or a client communication transmission between the computing device associated with the agent and the mobile computing device until the connection is sufficient for the bidirectional transmission.

16. The media of claim 15, wherein the request comprises one or more first images of damaged property for evaluation and one or more second images of the damaged property for evaluation, the operations further comprising:
transmitting the one or more first images of damaged property for storage by a database external to the virtual collaboration server;
transmitting the one or more second images of the damaged property for storage by the database; and
determining an instance of fraud based on comparing the one or more first images with the one or more second images.

17. The media of claim 15, the operations further comprising:
receiving an indication of insufficient connection for the bidirectional transmission; and
reducing a bitrate of the transmissions from the computing device until the bitrate is within an available bandwidth for bidirectional transmission.

18. The media of claim 15, wherein the request to initiate the communication session regarding the damaged property comprises a request to initiate the communication session using a login-free connection.

19. The media of claim 15, wherein the request comprises a response to a personalized link, and wherein the personalized link comprises an indication of:
an individual associated with the damaged property; and
the claim type.

* * * * *